United States Patent [19]

Showalter et al.

[11] 4,318,386
[45] Mar. 9, 1982

[54] VORTEX FUEL AIR MIXER

[75] Inventors: M. Robert Showalter; Kenneth W. Kriesel; Charles L. Siewert, all of Madison, Wis.

[73] Assignee: Automotive Engine Associates, Madison, Wis.

[21] Appl. No.: 77,759

[22] Filed: Sep. 20, 1979

[51] Int. Cl.³ .............................. F02M 29/06
[52] U.S. Cl. .................. 123/590; 123/545; 123/549; 123/188 M; 55/466
[58] Field of Search .............. 123/590, 591, 592, 306, 123/545, 547, 549, 188 M; 261/78 R, 79 R, 22; 48/180 R, 180 C; 55/466

[56] References Cited

U.S. PATENT DOCUMENTS

| | | | |
|---|---|---|---|
| 1,993,155 | 3/1935 | Faber, Jr. | 123/188 M |
| 2,232,413 | 2/1941 | Steskal | 123/545 |
| 2,411,204 | 11/1946 | Graziano | 123/549 |
| 3,146,768 | 9/1964 | Osborne | 123/590 |
| 3,273,161 | 9/1966 | DiGiorgio | 123/548 |
| 3,336,017 | 8/1967 | Kopa | 55/466 |
| 3,395,899 | 8/1968 | Kopa | 261/22 |
| 3,736,911 | 6/1973 | Melchlor | 123/306 |
| 3,874,357 | 4/1975 | List et al. | 123/590 |

FOREIGN PATENT DOCUMENTS

| | | | |
|---|---|---|---|
| 868282 | 12/1941 | France | 123/590 |
| 34264 | 11/1934 | Netherlands | 123/306 |
| 374521 | 6/1932 | United Kingdom | 123/306 |

*Primary Examiner*—P. S. Lall
*Attorney, Agent, or Firm*—Witherspoon & Hargest

[57] ABSTRACT

A vortex fuel air mixer is positioned between the air throttle and the intake manifold of an engine. Part of the expansion flow velocity past the air throttle flows tangentially into the vortex chamber of the mixer, providing angular momentum which drives the flow into a vortical pattern. The flow streamlines within the vortical flow form into a generally irrotational flow pattern which swirls from the outside wall of the vortex chamber inwardly to a central vortex chamber outlet. This outlet feeds the engine intake manifold. Centrifugal forces in the swirling flow fling fuel droplets to the outside wall of the vortex chamber (in the manner of a cyclone scrubber). This liquid fuel must evaporate in order to leave the vortex chamber. The interaction of the evaporation, flow structure and turbulence relations inside the vortex chamber produces an essentially homogeneous mixture at the vortex chamber outlet. Fuel evaporation time in the vortex chamber is quite short, so that the device exhibits excellent transient response.

56 Claims, 31 Drawing Figures

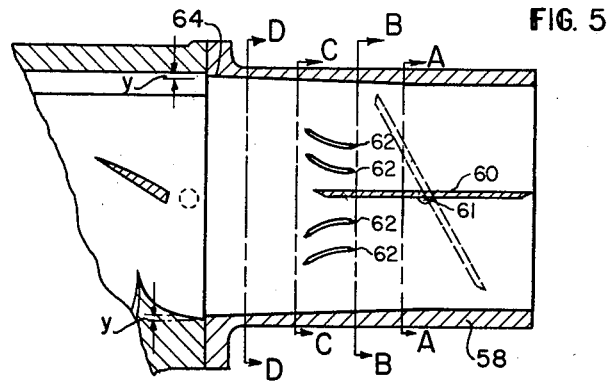
FIG. 5
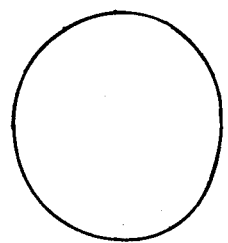
FIG. 5 A-A
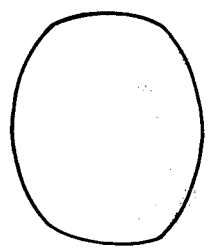
FIG. 5 B-B
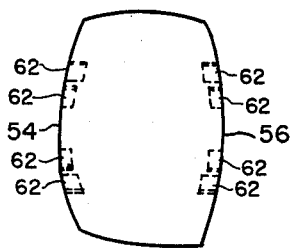
FIG. 5 C-C
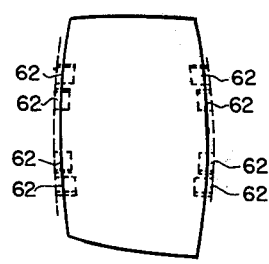
FIG. 5 D-D $$V_{tr} = \frac{V_{tr_0} r_0}{r}$$
$(mvr = k)$

IRROTATIONAL VORTEX FLOW TO CENTRAL SINK:

$$V_{TANGENTIAL}(r) = \frac{V_{tr_0} r_0}{r}$$

$$V_{RADIAL}(r) = \frac{V_{r r_0} r_0}{r}$$

FIG. 10
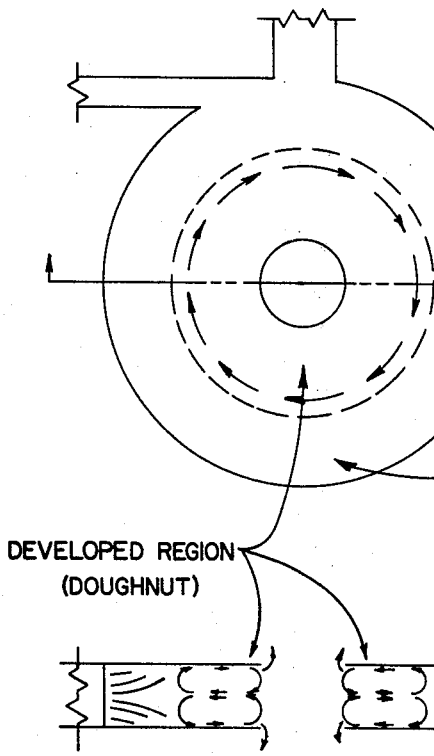
DEVELOPED REGION (DOUGHNUT)
DEVELOPING REGION
SOURCE FOR FIGURES 10 & 11
"DESIGN THEORY OF
FLUIDIC COMPONENTS"
BY: JOSEPH M. KIRSHNER AND
SILAS KATZ
ACADEMIC PRESS, INC.
FIG. 11
FIG. 12
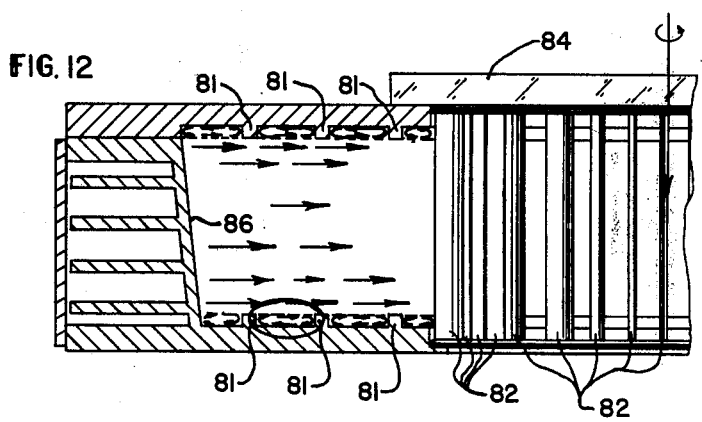
FIG. 12a

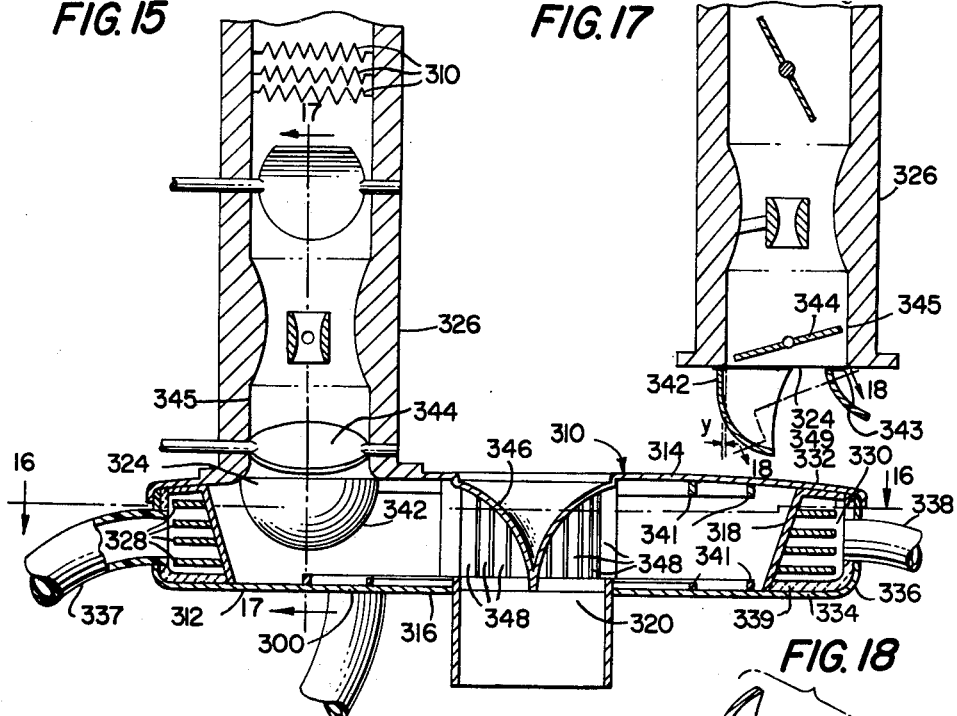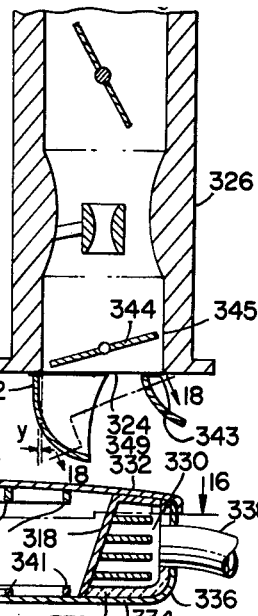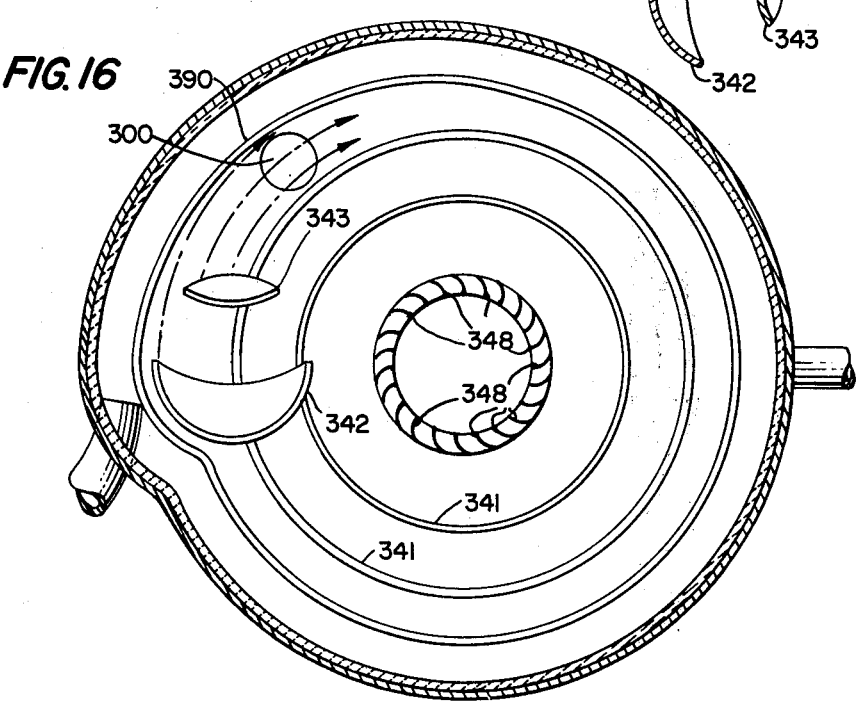

VORTEX FUEL AIR MIXER

BACKGROUND AND OBJECTS

The time and space available for fuel air mixing in an internal combustion engine is limited, and "Homogeneous charge" engines do not burn really homogeneous mixtures. The incompleteness of mixing, and the unsteadiness of air fuel ratio delivery to the cylinders under transient response, degrade engine performance significantly from what would be possible with quicker transient response and more homogeneous mixing. Because the physics of mixing processes is complicated, and because mixing states are difficult to measure experimentally, the great importance of mixing in engines is not widely understood. It is the purpose of the present invention to use structured turbulent flows to mix fuel and air in an organized way involving much higher mixing rates than have previously been possible. The device is characterized by excellent transient response and much more homogeneous fuel air mixtures than have previously been practically available. To understand the technical problems which the current invention has solved, a discussion of conventional engine mixing processes is appropriate.

It is characteristic of present day carburetor and intake manifold systems that the fuel which passes the carburetor throttle is rapidly separated from the air and deposited downstream of the carburetor at the first turn. At this first turn is generally located an exhaust-heated hot spot. However, only a part of the fuel can evaporate on this hot spot surface. The rest of the fuel is not evaporated at the hot spot and deposits on manifold walls downstream. Once this fuel is deposited, it proceeds to the individual cylinders relatively slowly and somewhat unevenly.

Intake manifolds are carefully designed with contours on the manifold floor to try to distribute the liquid fuel evenly between cylinders. Even so, it is usually impossible to get very tight cylinder-to-cylinder distribution over all of the relevant speeds, under steady-state conditions of engine speed and load. Fuel-air proportioning is worse under transient conditions. The air velocity in manifold passages can be a substantial fraction of the speed of sound, but the fuel liquid film velocity is generally less than a tenth of the air velocity. Consequently, if an element of fuel and an element of air both leave the carburetor throttle at the same time, the fuel takes much longer to reach the cylinders than the air. On accelerations the mixture delivered to the cylinders therefore tends to shift lean. Acceleration enrichment arrangements must therefore be employed. The greater the acceleration enrichment, the greater the emission penalty involved.

The two-phase flow situation in a conventional intake manifold is quite involved. It is practically impossible to get the transient characteristics and cylinder-to-cylinder distribution characteristics that are desirable, even with very laborious development work in each intake manifold design because of the two phase flow relationships. The inability of conventional carburetor-intake manifold systems to perform well with respect to cylinder-to-cylinder and transient response characteristics has been the main motivation for the development of very expensive multi-cylinder fuel injection systems.

The need for fast transient response and tight cylinder-to-cylinder distribution becomes greater as emission specifications become more stringent and as fuel consumption becomes a more and more important issue. In engines which employ a three-way catalyst system to control emissions the "window" of satisfactory operation is of the order of + or—0.1 air/fuel ratio. With the 3-way catalyst system the penalty for slow transient response and inadequate cylinder-to-cylinder distribution can be drastic increases in nitric oxide production. Moreover, with emission control hardware, fuel and air are no longer the only two fluids to be mixed; in addition, it may be necessary to secure even distribution of exhaust gas recirculation from cylinder-to-cylinder.

Another approach to emission control is lean and dilute combustion. Operation with very lean (or EGR dilute) mixtures results in very low $NO_x$ emissions, and is advantageous from the point of view of the thermodynamic cycle. If fast and consistent combustion of lean or dilute mixtures is possible, significant improvements in fuel economy are achievable simultaneously with excellent $NO_x$ control. It will be shown in the detailed discussion that the level of enleanment or dilution permissible with good combustion and good drivability is very sensitive to the details of the mixing state of the fuel air EGR mixture. As cylinder-to-cylinder and microscale mixing statistics become tighter, leaner and more dilute mixtures can be efficiently burned. Therefore, the excellent mixing of the present invention widens the air fuel ratio limits of satisfactory engine combustion and permits significant improvement in emissions and fuel economy with dilute mixtures. Experimental data with the mixing vortex have been obtained which indicate that it will be possible to achieve the required $NO_x$ control with much improved fuel consumption with this lean combustion approach, without any necessity for 3-way catalysis.

The mixing state inside the cylinders and the cylinder-to-cylinder variation delivered to the engine is controllable by the state of mixing upstream of the manifold runners themselves. For some time it has been known that an intake manifold which receives a homogeneous mixture of fuel and air will distribute a homogeneous air fuel mixture to its individual cylinders. This is reasonable, since the flow of mixed gases through a passage cannot well be expected to unmix the gases. Condensation rates of fuel from a homogeneous vaporized mixture are generally quite low, even if the manifold is below the equilibrium air distillation EAD, temperature. Also the intake manifold passages quickly warm above the condensation temperature of the fuel-air mixture under normal engine operating conditions. Therefore, if the fuel from the carburetor or other fuel-air metering system can be homogeneously mixed with the air from the carburetor (and with EGR, Exhaust Gas Recirculation) prior to delivery to the intake manifold, design of the intake manifold can be very much simplified.

Designing a manifold for low flow resistance and good mass-flow distribution from cylinder-to-cylinder is a much easier problem if the manifold only handles pre-mixed vapors. The difficulty of designing manifolds presently comes because they are asked to be at once mixing devices, evaporators, and flow channels for both liquid fuel on walls and for the much higher velocity air stream in the flow channels.

It is therefore desirable to design a system where the fuel is evaporated and homogeneously mixed with the air and with any EGR prior to introduction of the mixture into the intake manifold per se. Advances in fluid mechanical knowledge based on the fluid mechanical field of "fluidics," and conceptual advances with respect to the interaction between flow structure, turbulence, and mixing largely made by R. Showalter, have made design of such a mixing system on the basis of calculable physical effects possible. To understand how this can be so, it is necessary to describe in a little detail the physical processes which must occur in order to evaporate fuel into the air and homogeneously mix the fuel with the air.

First of all, it is useful to consider the process of fuel evaporation. Research has shown that, at least so far, the only practical way to achieve droplet sizes sufficiently small so as to be in stable aerosol suspension under the turbulent flow conditions in an intake manifold (below about 1 micron) is to have these droplets form by condensation from the vapor. Complete mixing requires either complete evaporation or stable aerosol droplets. Even if the mixture out of the mixer involves stable liquid droplets, rather than completely evaporated fuel, the fuel must have been originally evaporated and then recondensed if it is to be in stable aerosol sized droplets.

Fuel vapor will evaporate into a surrounding gas only if the vapor pressure of the fuel at the liquid surface exceeds the partial pressure of the fuel vapor in the adjacent mixture. It is important to visualize the scale on which the evaporation process happens. At the liquid interface, molecules of fuel are evaporating and condensing continuously, and the number of molecules is sufficiently large that the statistical process is governed by exact physical laws. The volumes of vapor adjacent the liquid surface determine whether the liquid will evaporate or not. These vapor volumes are tiny, and are of the order of relatively few mean-free paths on a side (volumes of the order of cubic microns). Because vapor pressures in volumes so small are determinants of the evaporation process, evaporation is very closely coupled with mixing processes. Unless the rate at which fuel vapor leaves the vicinity of the liquid surface and diffuses into the air-EGR mixture is large, evaporation rates will be slow, even though the mixture is on gross volumes well away from saturation conditions. The elements of gas relevant to the evaporation process can be saturated, at the same time that the total volume inside the mixer is far away from saturation.

Evaporation is produced by the interaction of mixing at all scales, the gross vapor pressure of fuel in the air, and the vapor pressure of the liquid fuel surfaces. The vapor pressure of the liquid fuel is clearly related to heat transfer issues. To evaporate the fuel requires a supply of the fuel's heat of vaporization. Heat transfer also matters because liquid vapor pressure is a strongly increasing function of the liquid temperature. For any given mixing situation, evaporation rates will be proportional to the difference between liquid surface vapor pressure and the average vapor pressure in the mixing channel. Therefore, evaporation rates will increase very strongly as liquid surface temperature increases.

However, in an engine, there are strong practical reasons for wishing to minimize the amount of heat added to the mixture. First of all, low mixture temperatures help control detonation and maximize engine power. Secondly, hot surfaces tend to form undesirable deposits. The more rapid the mixing within the mixing section, the less heat or internal energy need be supplied to evaporate and mix the fuel (although the heat of vaporization must be supplied in any case) and the cooler the surfaces and mixtures can be. For all these reasons, mixing matters in the evaporation process. Fuel evaporation and fuel-air mixing are not the same thing, but the processes are coupled.

Mixing is a complex process, and is the interaction in space and time between molecular diffusion, turbulent diffusion, and the non-random convection of fluid elements along mean-flow stream lines. Most engineers are taught to feel that when a flow becomes significantly turbulent, it is no longer reasonable to attempt (even conceptually) to model the process in its details. It happens that this view, although widespread, is also wrong. Flow in many passages of practical interest can be characterized in terms of mean flow streamlines. These streamlines define flow patterns which occur because of basic internal and pressure equalization physical laws. Turbulence is superimposed on these mean flow streamlines, but the fraction of the kinetic energy in the flow which is in the form of the mean-flow pattern is often much larger than the fraction of the flow energy which is in the form of the very much smaller scale turbulent fluctuations. For certain practical sections, these mean-flow streamline patterns, or flow structures, are stable and reasonably predictable over quite wide ranges of massflow (and identically wide ranges of Reynolds number). These mean flow patterns can fold mixants together in an organized way, and greatly increase mixing rates over what would be possible with turbulence alone.

Mixing is the interaction of molecular diffusion (a random-walk process), turbulent diffusion (which is modelled as a random-walk process), and mean flow patterns (which involve non-random flow processes). It should be mathematically apparent that a random-walk process is much less efficient for traveling between two specified points than the properly chosen non-random process. Fundamentally for this reason, the properly chosen flow patterns can very greatly increase the rate of mixing in a mixing section, by doing the large-scale stretching and folding of the fluid elements in a non-random way. For example, the flow structure can systematically convect the least saturated air to the liquid surface for evaporation. The flow pattern can also systematically stretch out interfacial areas within the flow, increasing mixing area and reducing the mean distance over which the random-walk processes of turbulent and molecular diffusion must act. It turns out that properly chosen flow structures can in this way increase mixing rates by very large factors over mixing rates which would occur if the flow relations were purely random. Since there is little time and space available in an engine for fuel-air mixing, the more rapid mixing possible with structured turbulent flow is practically important.

Much background in producing desired flow structures has been worked out by the field of "fluidics," which uses flow relations to produce information-handling devices that operate because there are stable fluid flow modes in the flow elements of the fluid circuits. The physical laws which are most useful for producing predictable flow modes for flow structures are conservation of linear momentum, Bernoulli's equation which establishes well-defined relations between fluid velocities and fluid pressures, and the wall-attachment effect called "Coanda" effect. From conservation of linear momentum, conservation of angular momentum can be derived. It should be noted that the fluid mechanical laws, which fluidics teaches one to manipulate, continue to be valid when a flow becomes turbulent, therefore fluidics is very useful in permitting one to produce and understand flow structures under turbulent conditions.

The present invention uses fluidic fluid mechanics and mixing and heat transfer theory in the following way. Spark-fired engines are throttled, and the pressure drop across the throttle accelerates the flow in a near isentropic expansion, so that the flow velocity just downstream of the throttle is very often a significant fraction of sonic velocity (or sonic velocity itself). Just downstream of the throttle plate, the flow work across the throttle is stored in the fluid elements in the form of kinetic energy. These fluid elements have very significant linear momentum per unit mass. This flow momentum, properly utilized, is more than sufficient to produce a very strongly structured flow pattern downstream of the throttle plate. In current engines, the flow energy and momentum available just downstream of the air throttle is dissipated into turbulence and into unstable vortices. However, correctly designed deflectors can deflect this flow so that a high fraction of the isentropic velocity past the throttle plate is delivered in coherent form at high velocity into a channel. In the present invention, the outlet of this mixing channel is off-center with respect to the inlet point of the mixing channel by a distance R. If the flow velocity from the inlet point is resolved into vector components with respect to radial line R, including a vector component parallel to R, $V_r$, and a velocity vector component perpendicular to the line R, $V_t$, (or velocity tangential), then the fluid introduced into the channel will have angular momentum with respect to the center of the outlet. (Angular momentum is defined as $MV_tR$). In the present invention, the channel peripheral walls are roughly concentric with respect to the mixer outlet. The flow from the deflectors from the throttle plate will progress until it interacts with the peripheral walls of the channel and it will lose some of its velocity by drag interactions with respect to this wall. However, if the passages are properly shaped, much of the momentum of the fluid will remain. Conservation of angular momentum is one of the most basic of physical laws. Therefore, it is relatively easy to design a mixture channel where the flow velocity from the deflectors is formed into a stable vortex flow pattern where the mean flow structure of the flow pattern is dominated by the physical relations of conservation of angular momentum. This flow characteristic will be discussed in more detail in the Detailed Description. However, it should be noted here that the vortex flow so established can be made to be a flow structure which is stable over a very wide range of Reynolds numbers (wide enough to cover the entire phase space of engine operation), and that the flow structure is one with very great advantages with respect to the mixing and evaporation functions which need to be served. First of all, the vortex flow pattern will serve strongly as a separator of the liquid fuel from the channel air flow, so that the fuel will deposit on the peripheral wall of the vortex chamber in a manner which should be easy to understand for those who understand cyclone scrubbers: The centrifugal forces in the vortex at the outside wall will be in the range of hundreds or thousands of G's. If this outside peripheral wall is heated, a very good heat transfer contact with the liquid fuel to be evaporated can be established. Secondly, the flow pattern is one wherein the air which is least saturated with fuel is the air which will be thrown to the outside of the vortex, so that the fuel is constantly exposed to the air which has the lowest vapor pressure of fuel in the chamber. Once the fuel is evaporated, the flow relations of the vortex (which is a turbulent flow with a pronounced mean flow streamline pattern) efficiently completes the mixing process. By the time an element of fuel air mixture reaches the central outlet of the vortex chamber it is substantially homogeneous all the way down to mean-free-path scales.

The operation of the vortex device is somewhat more advantageous than might at first appear. For example, under cold start conditions, the function of the vortex as a centrifugal separator of liquid droplets is most useful. During the start-up vapor leaves the vortex. If a rich mixture is delivered from the carburetor, an equilibrium splash-cloud of droplets around the outside vortex wall is quickly established. This splash-cloud has a very high surface area of liquid and very rapidly evaporates the light ends of the fuel into the air. The vortex at this time functions as an approximation of an equilibrium air distillation still and makes it possible to start the engine on a relatively lean mixture even during choke periods. Since the air fuel ratio coming out of the cold vortex can be much leaner than the mixture delivered to it, high CO and HC emissions are not necessary during the start-up process. For the same reason, the fuel penalties of cold start mixture enrichment need not be experienced since the cylinders need never see an over-rich mixture.

The mixer can be designed to warm up very quickly, and heating of the outside walls of the vortex channel is very advantageous because it permits the liquid surface to be evaporated to be at a much higher temperature than the mean temperature of the mixture in the vortex, so that the diffusion gradients driving the evaporation process can be made very large. In this way the peripheral walls can be operated so that evaporation rates are so fast that only a relatively small fraction of the peripheral wall needs to be wet at any time. This means that the mass of liquid fuel in the mixer at any time can be made very small, and therefore the time lag between fuel transport through the vortex and air transport through the vortex can be held to a very small value.

Under very low intake manifold vacuum (very high power demand) the operation of the vortex is beneficial, too. Under these conditions the liquid fuel evaporates and rapidly recondenses in the form of droplets well below one micron, so that the vortex functions as a smoke generator and mixer and the volumetric efficiency of the engine is increased because of the reduction in the mixture temperature delivered.

Experiment has shown that the present invention works well as an evaporator and mixer. Certain points are important with respect to its significance. First of all, it has been shown that the mixing device will produce cylinder-to-cylinder air fuel distribution which is so tight that cylinder-to-cylinder variation cannot be conveniently measured. This is fuel-air distribution much tighter than that attainable with fuel injection systems. Secondly, the mixing system has very rapid transient responses and the rapid transient responses very much reduce the necessary trade-off between low emissions and drivability. The microscale homogeneity from the system widens the lean limits of engine operation, making improvements in both efficiency and emissions possible. Also, the mixing device evaporates efficiently enough that it will tolerate gasolines having end boiling points significantly higher than those which are tolerable with current engine systems. This is an important issue, because widening the end point specification for gasoline significantly reduces refining costs. There are also indications (which will require more research to establish) that the vortex mixer will permit the use of napthalenic and other low hydrogen to carbon ratio hydrocarbons in motor fuel. If this proves to be possible it will greatly ease the problem of producing motor fuels from synthetic sources, such as tar sands, oil shale or coal. Government and industry supported research is now in progress concerning the vortex to test its ability to burn synthetic fuels, including alcohols and low hydrogen to carbon ratio fuels.

The vortex mixer will also permit the design of lighter, cheaper, and more efficient intake manifolds since these manifolds need not handle the complexities of two-phase flow. It should be mentioned that the mixing relations of the vortex mixer are such that it can be designed as a relatively low-drag device, permitting high peak power. The vortex mixer will also function to mix homogeneously EGR with the fuel and the air for even EGR distribution cylinder-to-cylinder. Because of these effects, it has been shown experimentally that the present invention vortex mixer simultaneously improves driveability, emissions, and overall fuel economy. The inventors wish to thank O. A. Uyehara, G. L. Borman, and P. S. Myers of the University of Wisconsin for many useful discussions during the development of the device.

IN THE DRAWINGS

Figure 1:
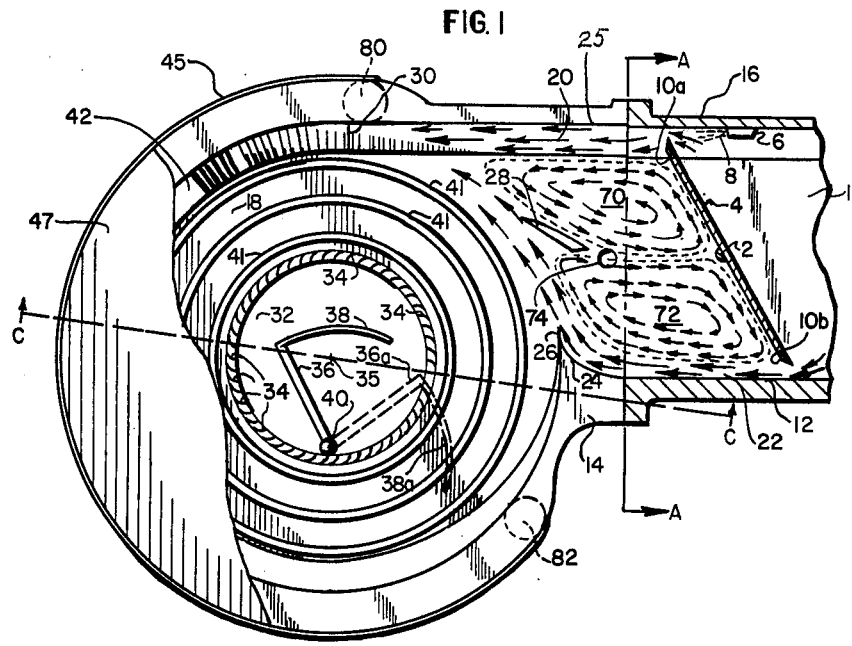
FIG. 1 is a top plan view of a preferred form of a vortex mixer, showing particularly fluid mechanical details in the entrance section which produce the smooth tangential flow introduction into the vortex mixer passage per se. Streamline patterns are shown by arrows and parasitic vortices 70 and 72 are surrounded by dotted lines for clarity.
Figure 4:
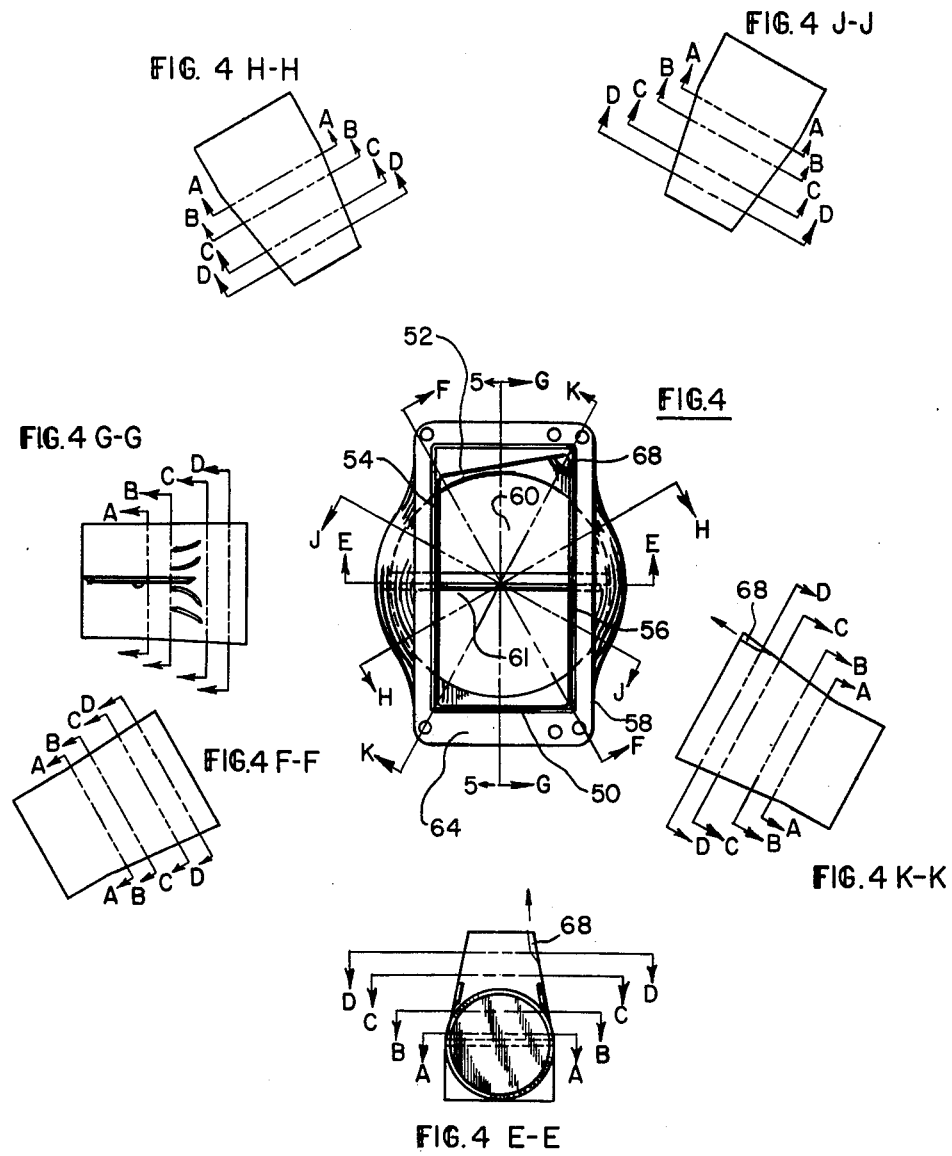
FIG. 4 shows a throttle body entrance section which could be bolted on along the surface of sectional A-A of FIG. 1 as a direct substitution for the assembly shown in FIG. 3 where the entrance section body involves a transition from a circular butterfly air throttle to the trapezoidal shape of the entrance section along sectional A-A.

FIGS. 4EE, 4FF, 4GG, 4HH, 4JJ, and 4KK are half scal sectional views of the throttle body internal surface showing the transition between the round throttle plate area and the trapezoidal entrance area at surface A-A of FIG. 1 for the entrance section structure of FIGS. 4 and 5. These views correspond to the planes identified by sectional lines EE, FF, GG, HH, JJ and KK respectively, shown in FIG. 4.

FIG. 5 is a side view of the round throttle plate to trapezoidal entrance passage of FIG. 4, viewing on sectional 5-5 of FIG. 4.

FIGS. 5AA, 5BB, 5CC, and 5DD are sectional views of the throttle body internal surface, showing the transition between the round throttle plate area and the trapezoidal entrance area at surface A-A of FIG. 1 for the entrance section structure of FIGS. 4 and 5, and corresponding to the planes identified by section lines AA, BB, CC, DD respectively, shown in FIG. 5. Section lines AA to DD are shown in FIGS. 4EE, 4FF, 4GG, 4HH, 4JJ, and 4KK.

Figure 6:
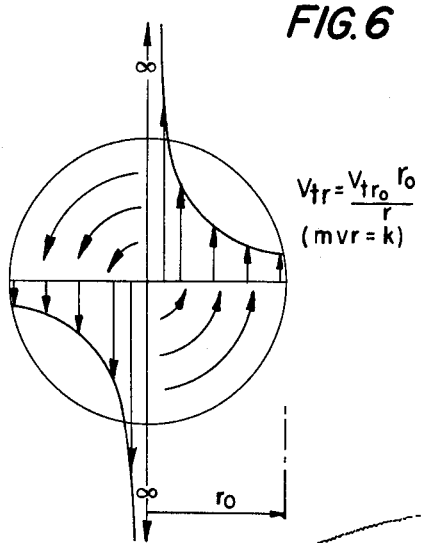

FIG. 6 is a projection showing the tangential velocity in an irrotational flow vortex as a function of radius.

Figure 7:
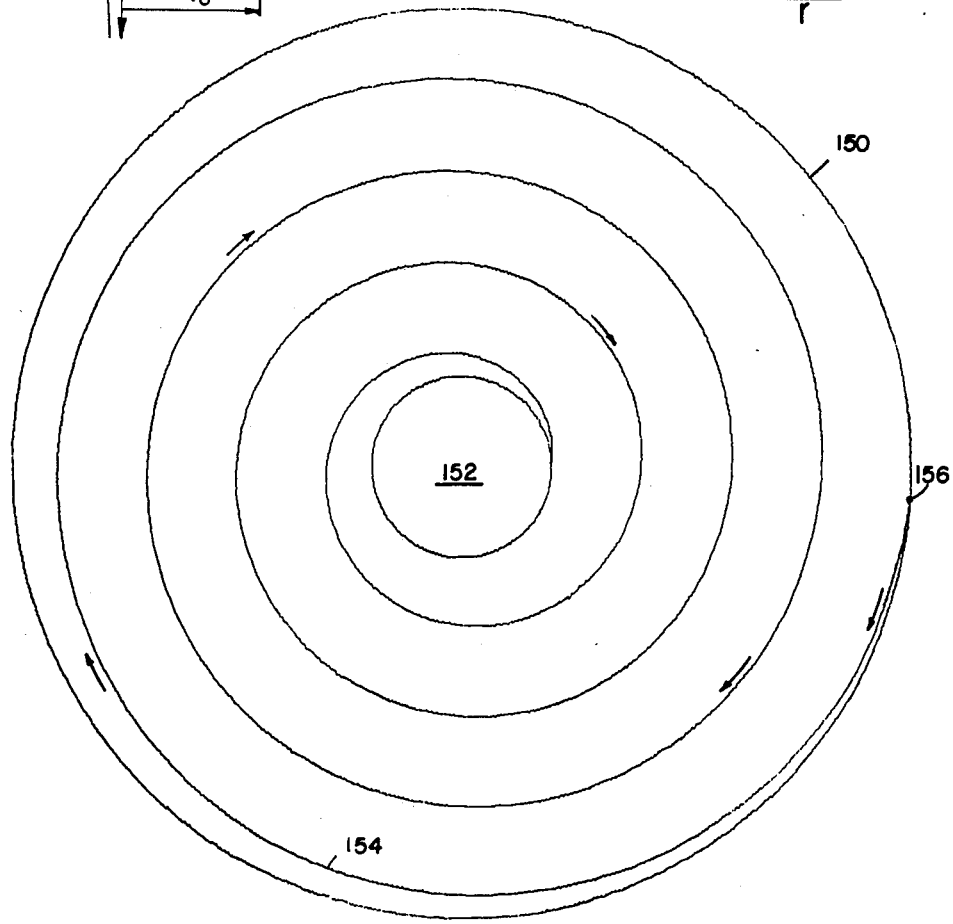

FIG. 7, including its exemplary equations, shows the constant pitch spiral flow streamlines characteristic of an idealized flow vortex having neither turbulence nor molecular diffusion, with the streamline plotted which would be followed by an ink line tracer from the outside of the vortex to its central sink.

Figure 8:
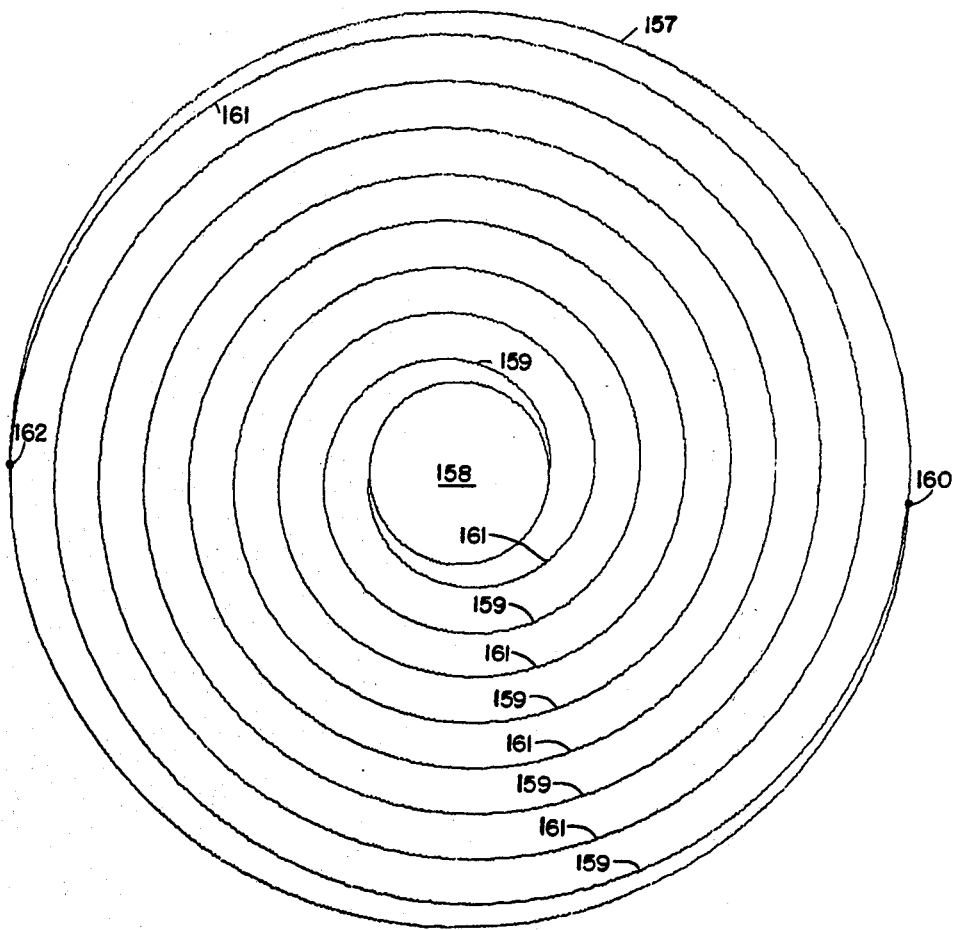

FIG. 8 shows an idealized irrotational flow vortex analogous to that of FIG. 7, but with two streamlines plotted to illustrated the nesting of the streamlines.

Figure 9:
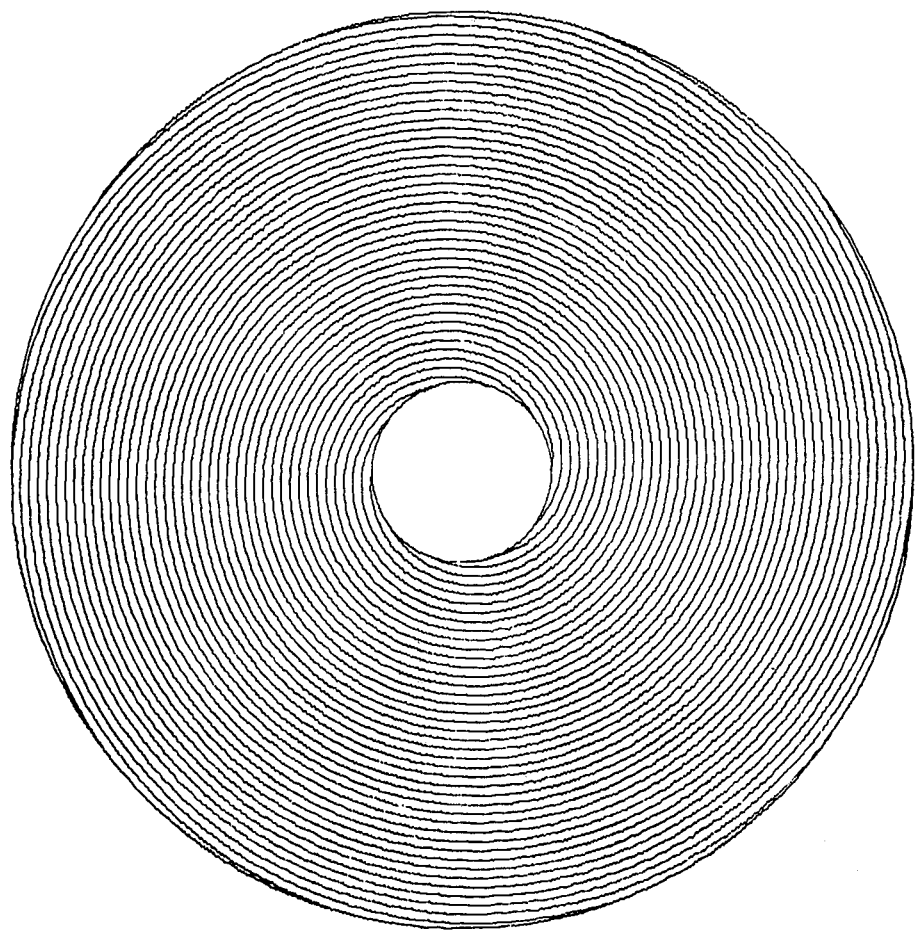

FIG. 9 is also analogous to the flow pattern of FIG. 7, and shows the nesting of 10 evenly distributed streamlines around the idealized vortex flow pattern. FIGS. 7, 8 and 9 are used to illustrate an important mathematical point about the mixing patterns within the vortex.

To achieve the flow patterns illustrated in FIGS. 6, 7, 8, and 9 in a practical mixer requires that boundary layer flow problems normally encountered in vortex passages be eliminated.

FIGS. 10 and 11 illustrate the more complicated flow pattern which occurs if the boundary layer is not properly controlled. These figures are taken from *Design Theory of Fluidic Components* by J. M. Kirshner and Silas Katz, Academic Press, 1975. FIG. 10 shows a cross section perpendicular to the axis of rotation of the vortex showing the more complicated vortex flow pattern which occurs because of boundary layer effects. FIG. 11 is a diametral cross section through FIG. 10 showing streamlines in the radial and axial direction which occur in this more complicated flow pattern.

Figure 2:
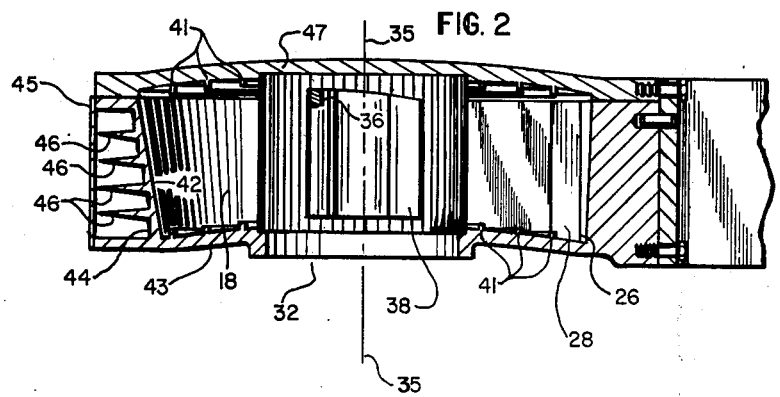
FIG. 2 is a side cut-away view along sectional line C-C showing details of the flow containing passages, particularly with respect to the vortex chamber per se.

FIG. 12 is analogous to FIG. 2, showing the fluid mechanical effects of circumferential weirs, 41, shown in FIGS. 1 and 2, showing how these weirs form recirculating vortices at the boundary layer which permit the central flow of the vortex chamber to be a fair approximation of the irrotational flow vortex pattern illustrated in FIGS. 6, 7, 8, and 9.

FIG. 12a is an exploded view of the circled area of FIG. 12, showing the flow between two weirs in more detail.

Figure 13:
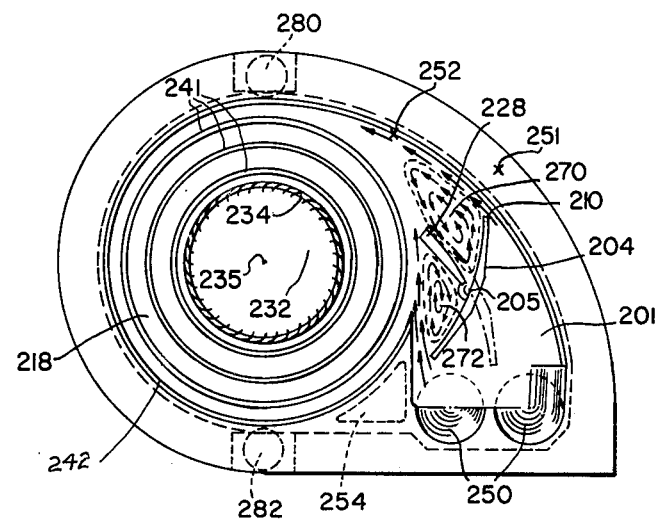

FIG. 13 is a top plan view of a vortex mixer analogous to that of FIG. 1, wherein the entrance flow geometry is arranged for connection with a two venturi down draft carburetor (carburetor not shown).

Figure 14:
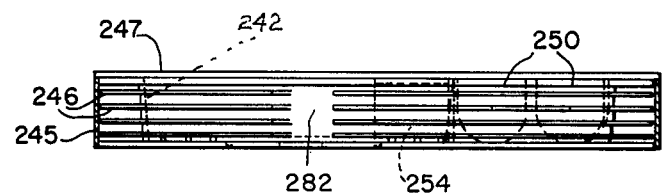

FIG. 14 is a vertical sectional view of FIG. 13 with the outside wall of the finned exhaust heat exchanger passage removed to show the geometrical arrangement of the fins.

FIGS. 15, 16, 17 and 18 show a more primitive vortex mixer adapted to a downdraft carburetor.

FIG. 15 shows a diametral vertical sectional view of the mixer, with the section bisecting the venturi of the attached downdraft carburetor.

FIG. 16 is a top plan view along sectional 16-16 of FIG. 15.

FIG. 17 is a side view along sectional 17-17 of FIG. 15 showing the relationship between the carburetor throttle body and the flow deflectors.

FIG. 18 is a sectional view along broken sectional line 18-18 of FIG. 17 further illustrating the shape of the deflectors.

Figure 19:
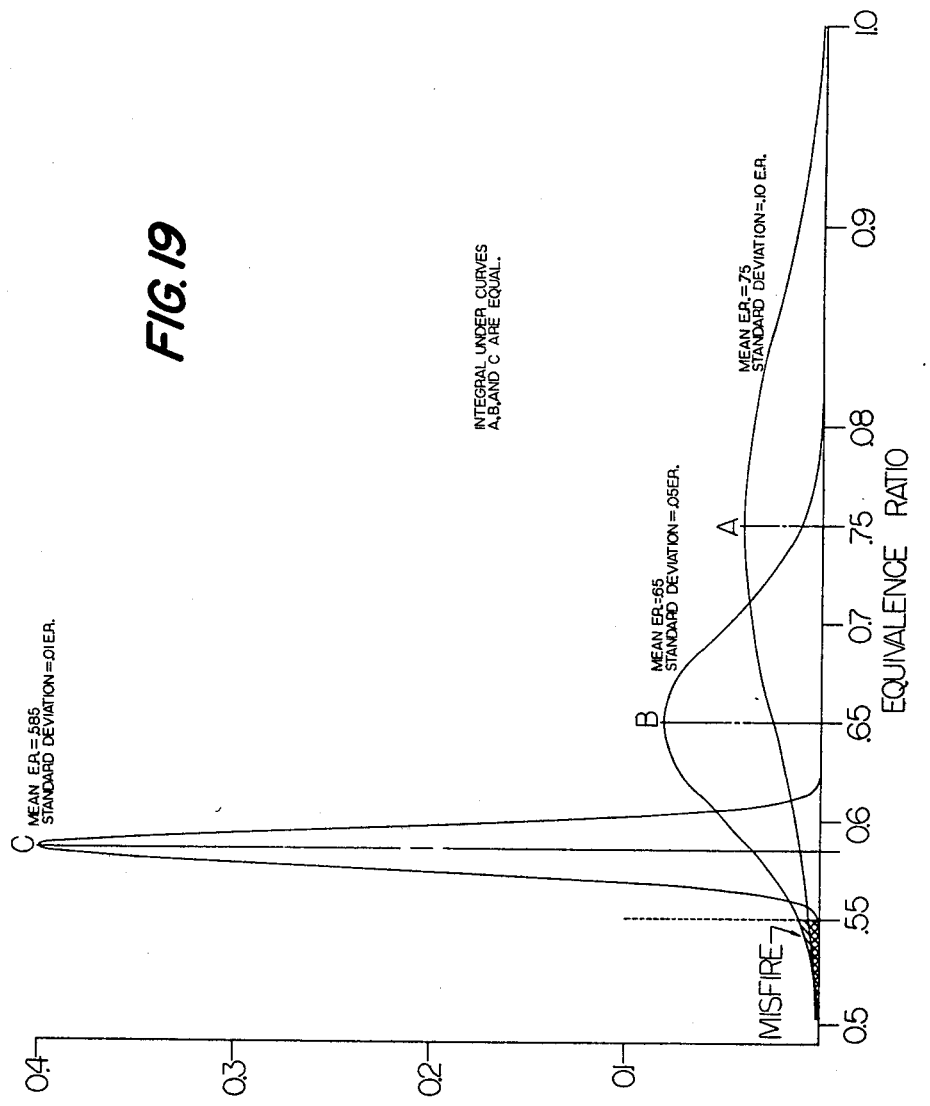
Figure 20:
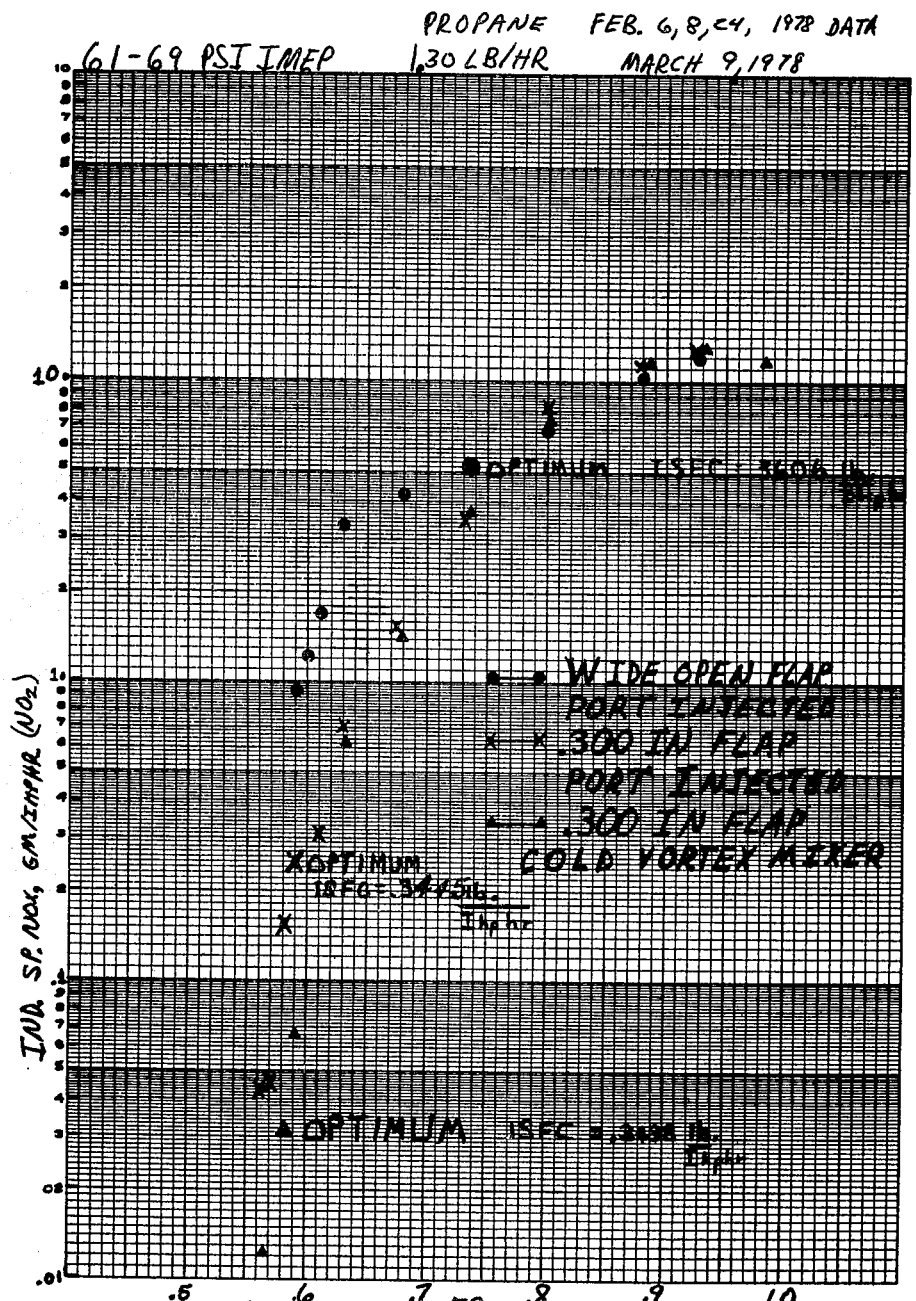

FIGS. 19 and 20 illustrate why the homogeneous mixing of the current invention is practically useful, and helps explain the necessity for tight cylinder-to-cylinder, microscale volume, and time sample air-fuel ratio statistics of low $NO_x$ outputs are to be obtained with a fuel efficient lean burn engine.

FIG. 19 illustrates mixing statistics with the numerical example of Gaussian air-fuel ratio distributions A, B, and C. The graph makes clear the advantage of mixing in extending the lean limit of satisfactory combustion.

FIG. 20 plots experimental data which shows the vital importance of mixing and equivalence ratio on $NO_x$ outputs and engine thermal efficiency.

DETAILED DISCUSSION

Figure 3:
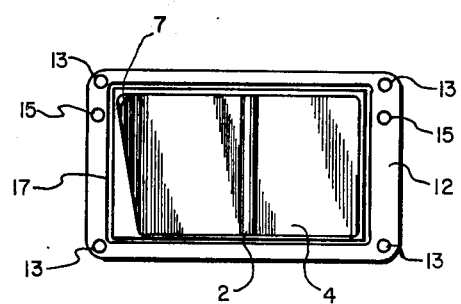
FIG. 3 is a view along sectional A-A of FIG. 1 showing the throttle plate of FIG. 1 in more detail. The trapezoidal throttle plate assembly shown can be replaced by the round-to-trapezoidal entrance section shown in FIGS. 4 and 5.

A preferred form of the present invention is shown in FIGS. 1, 2, and 3 with an important practical modification shown in FIGS. 4, 4EE, 4FF, 4GG, 4HH, 4JJ, 4KK, and FIGS. 5, 5AA, 5BB, 5CC, and 5DD. Because the fluid mechanics involved is far from the training of conventional automotive engineers, these drawings will have to be treated several times in this specification from several points of view.

FIG. 1 is a top plan view of the vortex mixer, with particular attention drawn by the flow lines to the fluid mechanics in the entrance passage. FIG. 2 is a side sectional view along section line C-C of FIG. 1 showing details not visible in FIG. 1. FIG. 3 is a view along sectional A-A of FIG. 1 showing the rectangular shaped air throttle passage characteristics of FIG. 1. Referring now to FIG. 1, the airflow to the engine is delivered to a passage 1 feeding throttle plate 4 which pivots on throttle plate shaft 2. In this specification the precise form of the fuel-air metering system is not specified, and the fuel introduction means in FIG. 1 is shown by means of a fuel spray nozzle 6 spraying into the airflow at 8. The edges 10a and 10b of the rectangular shaped throttle plate 4 are cut away to produce a smooth, sharp edged orifice effect for the airflow flowing between throttle plate 4 and throttle passage body 12. Throttle passage body 12 connects by fasteners to vortex mixer passage body 14. The details of the fluid mechanics within the entrance section conduit 16 and within the main vortex flow chamber 18 will be discussed in considerably more detail later. The high speed flow past the upper edge of throttle plate 4 forms high speed wall-attached jet stream 20, which attaches to the wall of the mixer passage according to the Coanda effect, which will be discussed subsequently. The wall attached stream flows smoothly and is introduced into the generally radially symmetric vortex mixer chamber 18 in coherent and tangential form. The high velocity jet 22 formed downstream of the lower edge of throttle plate 4 also forms a Coanda wall-attached stream and is deflected by deflection means 24 so that it is deflected at cusp 26 into the vortex chamber. The jet 22 flows past cusp 26 and interacts ballistically with static deflector 28 which deflects this jet into a smooth tangential introduction to the radially symmetric vortex chamber 18. These tangentially introduced flows from jets 22 and 20 flow via the Coanda effect in coherent form counterclockwise around the outside peripheral wall of chamber 18. The flow around the wall will pass by cusp 26 and merge with the flow from jet 22, interacting ballistically with deflector 28 and flowing again near the peripheral surface of the vortex chamber near surface line 30. The flow inside chamber 18 is therefore a swirling flow. This flow proceeds in a swirling manner inwardly toward the outlet 32 of the mixer chamber 18, which outlet 32 connects the vortex mixer with the intake manifold of the engine (not shown). The fluid mechanical relations within vortex chamber 18 form a flow pattern called an irrotational flow vortex. The details of this flow pattern will be discussed in more detail later. The swirling flow into outlet 32 is deflected by deflection vanes 34 so that the flow in the outlet section is not the strong irrotational flow vortex characteristic of the mixing channel 18 between the deflection vanes 34 and the outside wall of chamber 18 (going in the radial direction from the center 35 of the vortex mixing chamber 18). Within the outlet 32 is shown a strictly optional variable geometry deflection means 36, 38, 40, which can rotate (to a position denoted by the dotted lines 36a, 38a) to deflect the swirling flow within the vortex chamber 18 under conditions of wide-open throttle for engines where peak power is extremely important. This optional deflector eliminates an unavoidable flow resistance characteristic of the vortex flow pattern, and makes it possible for the vortex mixer of FIGS. 1, 2, and 3 to have excellent mixing under the lower loaded conditions characteristic of normal engine operation without any sacrifice of peak power flow capacity. The peripheral wall surface 42 of the vortex mixing chamber 18 collects the liquid fuel introduced into the mixing chamber due to centrifugal forces (analogous to those which operate in cyclone scrubbers). As was discussed in the Background section, this liquid must then be evaporated before it may pass through the vortex mixer. To provide the heat necessary to accomplish this, exhaust gas is passed through chamber 49 formed by peripheral finned wall 44 of the vortex and outer wall 45. Exhaust heat transfers to fins 46 on wall 42 which heats peripheral vortex wall inner surface 42. Exhaust gas past these fins 46 is supplied by the engine, and connection 80 and 82 connect to the exhaust passages of the engine (not shown). These fins 46, in connection with the peripheral wall surface 42 form an extremely effective heat exchanger arrangement which rapidly evaporates the fuel in the vortex section. In both FIG. 1 and FIG. 2 circumferential weir protrusions 41 are shown on the top and bottom roughly parallel surfaces of vortex mixing chamber 18. These circumferential weirs 41 have an important boundary layer conditioning function which will be discussed subsequently.

FIG. 3 is a view along sectional A-A of FIG. 1 showing the roughly rectangular throttle plate 4 and showing the manner in which the throttle passage body 12 may be connected to the main vortex mixer body 14. A number of fluid mechanical details with respect to FIG. 3 will be discussed later. However, it is worthwhile pointing out now that the generally rectangular throttle plate 4 has within its a notch 7 which forms the flow passage through which most of the idle airflow passes. Flow from this notch will form part of high-speed jet 20. The flow from the notch will be attached to both the side and top walls of the mixer. The spreading of the wall-attached jet from this notch will be less than the spreading which would occur at idle flows without the notch, with the consequence that the vortex flow in main vortex chamber 18 will be faster and more conducive to mixing because of the provision of notch 7 on throttle plate 4.

A number of practical issues concerning the fastening and sealing of the throttle passage body 12 to vortex body 14 are illustrated in FIG. 3. Bolt holes 13 for fastening are shown. Also shown are pin holes 15 for alignment between throttle passage body 12 and vortex body 14. A groove 17 for an O-ring type deformable seal is also shown. O-ring type seals are useful for sealing pieces of the current invention, since the O-ring seal does not protrude out between adjoining surfaces as conventional gaskets sometimes do. Because of details of the fluid mechanics in the mixer to be discussed later, careful alignment of the throttle passage body 12 with respect to vortex body 14, and smooth transitions between the airflow contacting surfaces are essential.

Those skilled in the automotive engineering arts should rapidly recognize an important practical disadvantage of the rectangular throttle plate in throttle passage body 12 shown in FIG. 3. The problem is simply that the seal between throttle passage body 12 and the upper and lower sides of throttle plate 4 is likely to produce enough leakage to be troublesome at idle, and involves difficult thermal expansion fit problems. FIGS. 4 and 5 show a throttle passage body which avoids this seal problem and still produces flow patterns to the left of the sectional A-A plane of FIG. 1 required for efficient vortex mixing.

For a conventional round butterfly airflow control valve, the difficulty with side seals does not arise (although tolerances between the throttle plate and throttle body section must be relatively tight for proper control of air flow at idle conditions.) FIG. 4 and sectional view FIGS. 4 EE, 4 FF, 4 GG, 4 HH, 4 JJ, and 4 KK combined with FIG. 5 and sectional views 5 AA, 5 BB, 5 CC and 5 DD illustrate an entrance section passage which may be bolted on at sectional AA of FIG. 1 exactly analogously to the entrance throttle passage body 12 of FIG. 3, where the air throttle is a round butterfly valve and where the entrance section passage surfaces are faired to produce a fluid mechanically smooth transition between the round throttle plate and the nearly rectangular opening at the entrance passage plane of sectional AA, with the surfaces and deflection arrangements shaped so that the predominant fraction of the high speed air flow past the throttle plate is delivered into the corners of the rectangular opening at sectional AA and along the near vertical surfaces 50 and 52, with the flow proceeding in a manner so as to minimize the fraction of the high speed flow which enters the vortex mixing section 14 adjacent surfaces 54 and 56. FIG. 4 is a view from sectional A-A of FIG. 1 viewing the round-to-rectangular transition passage which replaces the rectangular throttle entrance section shown in FIG. 3. Sectional view FIGS. 4 EE, 4 FF, 4 GG, 4 HH, 4 JJ, and 4 KK are included to illustrate the shape of this round-to-rectangular entrance passage 58. FIG. 5 is a side view of the entrance passage of FIG. 4 through sectional 5-5 which is a view from the other side of sectional GG. FIGS. 5 AA, 5 BB, 5 CC, and 5 DD show the internal surface shapes at sections AA, BB, CC, and DD respectively. In addition, these sectional figures show in dashed lines deflection vane outlines 62 for the top surface 56 and the lower surface 54, which vanes serve to deflect the flow so that it congregates in corners of the entrance passage trapezoidal entrance and avoids attachment to surfaces 54 and 56. Some of the fluid mechanics involved in the transition section 58 shown in the series of FIGS. 4, 4 EE, 4 FF, 4 GG, 4 HH, 4 JJ, 4 KK and FIGS. 5, 5 AA, 5 BB, 5 CC, and 5 DD must await further fluid mechanical discussion. However, gross structure is as follows. The entrance passage assembly 58 consists of a complexly shaped cast body in which is mounted a generally round throttle plate 60 which pivots on throttle plate shaft 61. The round flow passage which accommodates throttle plate 60 is faired to a generally rectangular shape before it connects at the surface AA forming surface 64. Deflection vanes 62 serve to push the flow to the outside corners of the trapezoidal entrance section and minimize high speed flow adjacent surfaces 54 and 56. Near the mating surface 64 in FIG. 4 in the corner between surface 52 and surface 56 is an idle flow passage 68 accommodating the majority of the idle flow of air to the engine, and arranged so that this idle flow enters the vortex mixer in the form of a high speed jet hugging its corner to produce enhanced vortex velocity and mixing in a manner analogous to that discussed in FIG. 3 with reference to throttle edge notch 7. This idle air flow is available to serve the purpose of an atomizing air flow if fuel is introduced upstream of the critical flow controlling restriction in this nozzle passage opening 68. Air flow and fuel flow past nozzle 68 is delivered in a form conducive to a very efficient jet attachment to the corner wall, so that the high speed flow proceeds efficiently into the vortex chamber 18, and so that the fuel introduction into the vortex chamber is extremely rapid. The flow direction from nozzle 68 is specified with reference to the flow arrows shown in FIGS. 4 KK and 4 EE.

At this point, the gross structure of the mixing vortex shown in FIGS. 1, 2, 3, 4, 4 EE, 4 FF, 4 GG, 4 HH, 4 JJ, 4 KK, and FIGS. 5, 5 AA, 5 BB, 5 CC, and 5 DD should be relatively clear.

High velocity air past the air control throttle to the engine flows tangentially into a vortex section and spirals inwardly into the outlet 32. The vortex flow within chamber 18 serves to separate the fuel and deposit it on peripheral wall 42 of the vortex chamber per se from whence it is evaporated and mixed into the inwardly spiraling airflow which flows to the outlet 32. However, it happens that the efficiency of function of the vortex mixer depends to a very important extent on details of the flow channel design which are generally not obvious to conventional automotive engineers.

In the course of discussing this invention with skilled automotive engineers, it has been the inventors' consistent experience that, even after careful instruction on the fluid mechanical details important to the function of the device, the conventional engineers make fluid mechanical mistakes which significantly degrade the function of the vortex mixer unless the details of the design are very carefully supervised by someone with experience in the field of fluidics. It has been our experience that mechanical engineers of conventional training, even at the Ph.D. level, have difficulty understanding and cannot visualize the fluid mechanical details relevant to the functioning of a fluidic device such as the vortex mixer of the present invention. Conventional mechanical engineers apparently find the concept of detailed structure in a turbulent flow difficult to deal with. Apparently ability to confidently manipulate this sort of fluid mechanics only comes after much study and some experience in actually building fluidic components.

A careful effort will be made in this specification to completely describe all the fluid mechanics necessary to build an efficient vortex mixer. However, the information involved is complicated enough that it is apparently difficult to remember and use it all at once. Therefore, it would be practically very useful for any firm wishing to make and use the present invention vortex mixer to employ someone skilled in the arts of fluidics to evaluate the design and to assist in any experimental development of the design which may be necessary. It is the inventors' judgment that this consulting expenditure will be inexpensive insurance for any serious production development of a vortex mixer.

The mixing and evaporating efficiency of the vortex mixer depend on the strength and flow pattern of the flow within vortex mixer chamber 18. What is desired is the strongest possible irrotational vortex flow rotating about the center 35. The stronger this flow, the more efficient the evaporation and the more efficient the mixing of the device. The strength of this vortex flow within vortex mixer chamber 18 depends on the mass mean flow velocity of the flow entering the mixing chamber tangentially from jets 20 and 22. The greater the fraction of the isentropic expansion velocity past throttle plate 4 which can be delivered in coherent form tangentially past point 26 and point 30, the stronger the vortex will be and the better the mixer will function. Relevant here are the mean flow velocity of the fluid entering the vortex chamber past point 26 and point 30, the flow patterns past these flow areas, and the turbulence intensity of the flow past these areas. The velocities, patterns, and turbulence levels are coupled. In general, it is desirable to have the flow delivered into the vortex as coherently as possible and with the maximum fraction of the energy in the flow in the form of mean flow streamlines (with minimum practical turbulence intensity). In order to secure the proper flow conditions at the tangential entrance of the vortex (points 26 and 30), the detailed geometry between the opening of the throttle plate and these entrance points must be carefully controlled. With proper control, it is possible under normal conditions to have the tangential introduction velocities past point 26 and point 30 in excess of 80 percent of the isentropic expansion velocity past the throttle plate. However, unless flow channel characteristics in the entrance section are properly handled, the flow velocity into the vortex channel may well be only a very few percent of the isentropic expansion velocity. The importance of the fluid mechanics in the entrance section cannot be overemphasized. Design errors in the entrance section which do not appear to be significant to a conventionally trained automotive engineer can have order-of-magnitude effects on the mixing rate in the vortex mixer. The flow shapings which are required to produce fluidic efficiency and high mixing efficiency in the vortex are not difficult to manufacture, but the geometrical issues involved cannot be ignored. For this reason, a fairly detailed description of the fluid mechanical relations in the entrance section prior to the flow introduction past point 26 and point 30 is required.

It is useful first to have a sense of the magnitude of the flow velocities to be expected past the air throttling valve under normal engine operating conditions. The following chart shows the relationship between intake manifold pressure drop from atmospheric pressure and the isentropic expansion velocity to be expected directly downstream of the air throttling restriction in the vena contracta. The chart plots mass velocities and spatial velocities vs. the pressure drop across the throttle. Throttle pressure drop is expressed two ways, first as the ratio of manifold pressure to atmospheric pressure. For each pressure ratio the corresponding intake manifold vacuum in inches of mercury is set down. For each pressure drop there corresponds a ratio of mass flow per unit area past the vena contracta, M divided by the mass flow per unit area which would occur under critical flow (sonic) conditions, M*. Also plotted against pressure drop is the velocity of the flow in the vena contracta in meters per second.

| $\dfrac{P_{IMV}}{P_{atm.}}$ | $\left(P_{atm.-29.9''Hg}^{IMV,\ inches\ of\ Hg}\right)$ | $\dfrac{M}{M^*}$ | velocity Meters/Sec. |
|---|---|---|---|
| .98 | .6" | .3 | 53 |
| .94 | 1.2" | .49 | 92 |
| .90 | 3" | .62 | 121 |
| .80 | 6" | .82 | 181 |
| .70 | 9" | .935 | 236 |
| .60 | 12" | .985 | 291 |
| .528 | 14.1" Hg | 1.00 | 335 |

Even at the lowest intake manifold vacuums normally encountered in engine operation, the velocities past the air throttle are quite substantial. The flow streams have very high momentum and kinetic energy because of these high velocities. Under normal conditions the isentropic expansion velocity past the air throttle will be a substantial fraction of sonic velocity. This is enough flow velocity, if the flow velocity of the jet can be maintained and delivered coherently, to drive the vortex to produce an extremely strong and efficiently mixing vortex in vortex chamber 18. However, unless design care is taken, the high isentropic velocity directly downstream of the air throttle will be rapidly dissipated into turbulence, with the result that only a very small fraction of this velocity will be available to drive the vortex in chamber 18. To understand how the high velocity flow directly downstream of the air throttle restrictions can be maintained to drive a strong vortex, it is necessary to understand the Coanda effect and the effect of stable parasitic vortices such as those which are shown in FIG. 1.

High speed flow streams close to walls attach to these walls according to the Coanda effect which is one of the bases of fluidics (for a detailed explanation of the Coanda effect, see pages 131 to 139 of *Fluidics, Components and Circuits* by N. Foster and G. A. Parker, Wiley Interscience, 1970: this reference is useful for many issues in fluidics).

The principle of wall attachment is important enough that it must be described in some detail here. Basically, a jet entrains flow on both sides. If the jet is near a wall, fluid entrainment generates a reduced pressure on the wall side with respect to the outside of the jet flow. Because of the pressure difference between the wall side and the outside of the jet, the jet flow path curves towards the wall (the jet is sucked towards the wall). As the jet bends towards the wall, the wall pressure becomes smaller, the suction stronger, and in consequence the jet attaches to the wall. This attachment effect is utilized in a number of important digital fluidic logic circuits, for example, those invented by Raymond Warren, et al, at Harry Diamond Laboratories. The Coanda, or wall attachment effect, is of great importance to the design of the vortex mixer because a wall attached stream (particularly one adjacent to a properly set up parasitic vortex flow) spreads much more slowly than a non-wall-attached stream would. Since the jet velocity and the jet area are inversely related for a set mass flow rate, minimizing the jet spreading angle minimizes the jet flow area and maximizes the jet velocity, which is desired to strongly drive the vortex in chamber 18.

Wall attached jet flows attach particularly well in corners of passages, such as occur at the outlet of throttle notch 7 in FIG. 3, and at the corners of the flow passage shown in FIGS. 4 and 5. Flows attached to such corner passages have smaller losses than jets attached to extended flat surfaces. Notch 7 shown in FIG. 3, and the deflectors 62 shown in FIG. 5 are designed to put wall attached jets in passage corners for delivery to the vortex mixer passage 18. Idle flow passage 68 shown in FIG. 4 serves the same purpose.

Referring specifically to the device shown in FIGS. 1, 2, 3, flow past throttle 4 flows between edges 10a and 10b and the channel wall of throttle body 12. Flow past edge 10a attaches to the channel wall of 12 and flows to the junction between throttle body 12 and vortex chamber body 14 at the surface along which sectional A-A is taken. The high speed jet 22 which is formed past throttle edge 10b flows towards this surface of sectional A-A in an exactly analogous way. The surfaces 24 and 25 of the vortex chamber body 14 are set back so that the high speed jet flows 22 and 20 flowing over the plane of sectional A-A flow to a surface which is set back a distance Y from the surfaces of throttle body 12. This setback is not explicitly noted in FIG. 1, but an exactly analogous setback Y is shown in FIG. 5. In practice the surfaces downstream of the throttle body 12 must be slightly set back, but the setback desirable is smaller than can conveniently be shown in a patent drawing. Nonetheless, the importance of the concept of setback must be discussed in detail, since it is vital to the function of the current invention.

The stability of a wall attached stream is not simply a function of the intrinsic instabilities which come from high local Reynolds numbers. Small variations in flow geometry which might at first appear to be insignificant can, by producing large disturbances in the jet, cause a magnification of turbulence which causes the jet to "break up." Breakup drastically reduces the velocity and kinetic energy of the jet as it travels downstream from the disturbance, and therefore must be avoided if the vortex is to function efficiently. The setback (exemplified by setback distance Y) is important to the successful and reliable function of the vortex mixer shown in FIGS. 1 to 5. Streams which flow past a setback will, unless the setback is too great, reattach cleanly and with relatively small loss to a surface such as the downstream surfaces of channel 14. However, if setback distance becomes negative, so that the deflector protrudes into the wall attached stream, (this protrusion is denoted as a "step-up"), a high velocity element of fluid will collide with the step-up as with a brick wall. This flow element will deflect off the step-up in a manner which will strongly perturb the flow, breaking up and destroying the coherence of the jet and so ruining the efficiency with which flow velocity is delivered to drive the vortex in the mixer chamber 18. When the jet flow breakup occurs, the kinetic energy of the jet is quickly lost because the jet spreads at such an angle that the momentum of eht jet is dissipated in a large mass of turbulent fluid.

In mass production, exact shaping is not possible, and parts must be made within a range of dimensions called tolerances. Because step-up between the throttle body 12 and the surfaces of the vortex chamber body 14 is so detrimental, it is important that the parts be specified with setback in mind, so that within the actual production range of dimensional variation between throttle body 12 and vortex channel 14, step-up never occurs.

Since setbacks as large as 0.020 inch can be jumped by a wall-attached jet with smooth and low-loss reattachment on the downstream surface, and since the mixer is most efficiently manufactured by the intrinsically high tolerance manufacturing process of die casting there is no excuse for step-up ever occuring in production. However, if step-up is permitted to occur adjacent the high-speed jets 20 and 22 (or the analogous jets which occur from the entance section shown in FIGS. 4, 4EE, 4FF, 4GG, 4HH, 4JJ, 4KK, 5, 5AA, 5BB, 5CC, 5DD), the fluidic efficiency and mixing efficiency of the vortex mixer will be significantly degraded from that which would occur without the step-up.

Although the geometry of the flow channels with respect to issues such as setback is vital, it is not required that the vortex mixer have particularly smooth surfaces. Surfaces which come from even a badly controlled die cast process should be sufficient for the vortex mixer function. Boundary layer thicknesses are generally great enough to obscure the effect of most commonly encountered surface roughnesses. However, large surface irregularities, such as grains of sand protruding in the wall-attached jet, can significantly degrade the fluidic efficiency (defined as the ratio of tangential introduction velocity to isentropic velocity past the throttle restriction) of the device. Generally, it is easy to maintain quality control well enough to avoid these obstructions.

Referring to the flow patterns shown in the entrance section in FIG. 1, the fluidic function of the parasitic recirculating vortices 70 and 72 should be emphasized. As the high speed jets 20 and 22 flow along, they entrain fluid which flows with them. The fluid mechanical relations are such that recirculating vortices 70 and 72 form in the entrance section. The geometry of static deflector 28 assures that the relative positions of parasitic vortices 70 and 72 are relatively stable for a set of air throttle angle (and that the parasitic vortices enlarge or shrink smoothly during throttle actuation). This is important: Downstream of a conventional carburetor throttle are parasitic vortices analogous to vortices 70 and 72. However, there is no geometry which arranges these flows in steady form and the two vortices fluctuate in relative size with one becoming predominant, washing out, and then the next growing and washing out. This unstable flow pattern in the parasitic vortices is responsible for a number of mode shifts affecting fuel-air distribution in conventional intake manifolds. The flow patterns of parasitic vortices 70 and 72 are highly desirable, in that these vortices form stable flow patterns which minimize the shear between the velocity of high speed jets 22 and 20 and the surrounding fluid. For this reason, the parasitic vortices 70 and 72 greatly decrease the spreading angle of these jets 20 and 22 and in consequence significantly improve the fluidic efficiency of the entrance passage geometry. It is important for the designer of an entrance section to a vortex mixer to try to minimize the turbulence and maximize the stability of the parasitic vortices within the entrance section, since these parasitic vortices have important effects on the total fluidic efficiency of the mixer. For the generally rectangular entrance section of FIGS. 1, 2, and 3, this stability is a matter of course and does not require experimental checking. However, for a more complex shape such as the round-to-trapezoidal transition section shown in FIGS. 4, 4EE, 4FF, 4GG, 4HH, 4JJ, 4KK, 5, 5AA, 5BB, 5CC, 5DD, it is prudent to investigate the fluidic efficiency of the entrance section experimentally to make sure that high fluidic efficiency is in fact being obtained. Detailed discussion of this experimental function will follow. Referring again to the entrance section flow patterns in FIG. 1, hole 74 shows a desirable place to introduce exhaust gas recirculation flow if EGR is employed in the mixer. Any EGR flow past hole 74 would be intermixed by parasitic vortices 70 and 72 and smoothly introduced into the high speed jets flowing into the vortex mixing chamber 18.

More will be said later about the fluid mechanics within the entrance section. However, the purpose of the present invention is to produce a mixer producing essentially perfect fuel-air homogeneity and rapid transient response. Looking at the flow patterns within the entrance section and then considering (as will be done later) the vortical flow pattern within mixing chamber 18, it should be apparent that the transient response of the mixing device depends largely on the detailed manner in which fuel is introduced into the mixing channel. Clearly, fuel introduced into the parasitic vortices 70 and 72, or into the surfaces adjacent these parasitic vortices will be introduced into the vortex mixer more slowly than if the fuel were directly introduced into the chamber 18 by some fuel injection means, or if the fuel was injected directly into one of the high speed jets 22 or 20, as for instance by introduction into nozzle 68 of FIG. 4.

Referring again to FIGS. 1 and 2, in light of FIGS. 3 and 4 and 5, it should be clear that the high velocity flow pattern delivered past sectional AA in FIG. 1 should be much the same whether the entrance section 16 shown in FIG. 3 is employed or whether this section 12 is replaced by the round throttle to trapezoidal entrance section shown in FIGS. 4 and 5. In either case, smooth high velocity flows will be introduced tangentially past point 30 and past point 26 into the vortex mixing chamber 18. The flow introduced from jets 22 and 20 will have high angular momentum with respect to the vortex chamber center line 35, shown as point 35 in FIG. 1. For reasons which will be discussed in more detail subsequently, the flow field in the generally annular volume between peripheral vortex wall 42 and deflection vanes 34 will be in the form of an irrotational vortex flow field, where the angular momentum of the fluid will be approximately conserved as it spirals inwardly to the vanes 34 for delivery to the outlet section 32, from whence the mixture flows to the intake manifold (not shown). This irrotational vortex flow field within vortex mixing chamber volume 18 is an extremely high velocity flow field, where the mean flow streamlines are dominated by the fluid mechanical relation of conservation of angular momentum, with turbulence superimposed on the mean flow streamlines. The swirling vortex flow within mixing chamber 18 is of such high velocity under normal engine operating conditions that liquid fuel delivered into the vortex is rapidly thrown to the outside of the vortex and impacted against peripheral wall 42. The flow field is generally so strong, and the boundary layer adjacent surface 42 so thin, that this liquid fuel generally atomizes and rotates with the flow field in the form of a "splash cloud" rotating very near the peripheral wall 42, impacting upon deflector 28 and then re-impacting and rotating again around the vortex outside wall 42 until it is fully evaporated. The effect is that fuel evaporates around the entire peripheral wall 42 of the vortex chamber. The boundary layer turbulence adjacent surface 42 in the vortex is such that this evaporation process has the effect of introducing fuel vapor into relatively fuel-poor air in a structured turbulent flow mixing process characterized by extremely high mixing rates. Some of the details of this fluid mechanical situation inside vortex chamber 18 will be discussed subsequently. The flow, however, is very near to the irrotational vortex flow pattern which would be predicted analytically and the flow spirals into pressure recovery and vortex destroying vanes 34 so that the flow field within outlet 32 is turbulent and characterized by much lower vorticity than that characteristic of the flow within the annular volume between vanes 34 and peripheral vortex wall 42. Vanes 34 around the outlet 32 serve a dual purpose in the mixing device. First, they reduce the pressure drop which would otherwise occur across the mixing channel. Secondly, by eliminating a strong vortex in the outlet, and substituting a relatively isotropic finer grained turbulence they very much simplify the fluid mechanical relations in the intake manifolding (not shown) downstream of the vortex mixer. An additional effect of the vanes is to create in the center of the vortex mixer a volume which is fluidically decoupled from the fluid mechanics which govern the flow in the annular volume betweenn vanes 34 and peripheral wall 42. Because of this decoupling of the fluid mechanics, it is possible to place within the volume of outlet 32 a deflection arrangement 38, 36, 40, which can, when very low flow resistence is required for wide open throttle operation, rotate to the position shown in the dashed lines 36A and 38A. When this deflector is in this extended position, it largely destroys the vortex flow pattern within mixing chamber 18, and in consequence reduces the flow resistance of the total mixing flow channel for wide open throttle power conditions. Under wide open throttle conditions very tight cylinder-to-cylinder distribution is of secondary importance so that destroying the vortex flow pattern is tolerable. Under the much more common part load conditions when the engine is throttled, the deflection means 36, 38, and 40 do not in any way impair the mixing of the device.

In FIG. 2, it is shown that the lower wall of mixing chamber 18, wall 43 and the upper wall of chamber 18 wall, wall 47, are surfaces of revolution curved upward, so that the axial height clearance between wall 43 and wall 47 is roughly constant in the radial direction from center line 35. This curvature can be useful under cold start conditions where liquid accumulates within the mixing chamber 18, because it allows a significant accumulation of liquid fuel within the vortex before any liquid can flow out of the mixer and into outlet 32, for delivery to the intake manifold. It should be noted also that it is not a requirement that the axial height between the top and bottom walls of the mixer be constant with respect to radial distance from the vortex mixer center. However, this constant axial height relation does simplify the pattern of the mean flow streamlines through the vortex mixer, in a way which will be made clear in the subsequent discussion.

Consideration of FIGS. 1, 2, 3, 4, and 5 should make it clear that the flow pattern within the vortex mixer of the present invention will not be a perfect irrotational flow vortex, both because the introduction means will perturb the flow, and because the flow will be significantly turbulent. Also, there will be momentum interactions with the peripheral wall 42, weir sections 41, top 47, and bottom 43. Nonetheless, the physical relations of conservation of angular momentum are sufficiently important that the flow within the chamber 18 shown in FIGS. 1 and 2 will be approximately an irrotational flow vortex, and it is therefore worthwhile to consider the flow streamline relations which occur in an irrotational flow vortex. See FIG. 2, and consider polar coordinates centered at the center 35 of the outlet 32, so that flow velocity components would be defined in terms of a velocity in the radial direction $V_r$, and a velocity in the tangential direction, $V_t$. These velocities would be mean flow stream velocities: the real flow would clearly include a fluctuating component in both the tangential, the radial, and the axial direction. Flow into the vortex chamber from throttle passage body 12 or 58 would clearly have angular momentum with respect to the outlet 32 center 35. Conservation of angular momentum, $MV_tR$, dictates the increase in the tangential velocity of the fluid as it flows towards the center. It is easy to verify that the velocity in the tangential direction as a function of radius r, $V_{tr}$, will be expressible according to the relation $$V_{t(r)} = \frac{V_{tro}r_o}{r}$$

where $V_{tro}$ is the tangential velocity at the outside of the vortex, $r_o$ is the radius at the outside of the vortex, and r is the radius where the velocity tangential is taken. FIG. 6 illustrates the flow velocities which are produced in an irrotational flow vortex according to the above equation. The relation is obviously not valid for FIGS. 1 and 2 for radii inside the outlet 32, because of deflector vanes 34, but the equations describe the flow field in the annulus between wall 42 and vanes 34.

Because the flow is proceeding from the outside of the vortex to a sink at the center of the vortex, the mass flow rate in the radial direction through any cylindrical cut of the vortex section will be the same (outside of the outlet) so that the radial velocity will be inversely proportional to the radius for a mixing chamber 18 of constant axial height.

$$V_{r(r)} = \frac{V_{rro}r_o}{r}$$

where $V_{r(r)}$ is the radial velocity at radius r, and $V_{rro}$ is the radial velocity at the outside radius of the vortex. Clearly the above two equations are of the same form. It follows that for a set tangential velocity input (set by a given intake manifold vacuum) and a set volume throughput through the vortex (set for a specifice engine rpm) the ratio of the velocity tangential to the velocity radial will be constant for all the radii of the vortex. Flow streamlines in the vortex are therefore constant pitch inwardly flowing spirals for a vortex chamber of constant axial height. If axial height of the mixer varies, the spiral pitch will vary inversely as axial height as a function of radius.

The mean flow streamline pattern described above is a good approximation of the real flow in a vortex mixer such as that shown as mixing chamber 18 if certain fluidic details are tended to. So long as turbulence levels are sufficiently low and boundary layer flows adjacent top 47 and bottom 43 are controlled, the physical relations of conservation of angular momentum make the mean flow streamlines in the real flow rather close to the pattern of an irrotational flow vortex. In the real flow pattern the mean pattern has relatively fine scale turbulent perturbations superimposed upon it. The resulting combination of large scale patterning with fine scale turbulence is useful for mixing. It should be clear that drag interactions between successive radial elements will tend to reduce the velocity increase of the flow as it flows towards the center because the angular momentum as the flow flows towards the center will decay because of these drag losses. Too much flow turbulence can increase these drag interactions to the point that the irrotational vortex flow pattern is destroyed. For this reason, the entrance section of a vortex mixer must be designed with care, so that the flow delivered to the vortex chamber is not too turbulent. Nonetheless, the irrotational flow vortex form, as a flow mode, is extremely stable, and is representative of the flow inside a properly designed vortex mixer over its full operating range.

The interaction between mean flow streamlines and turbulence is a most important one if one is to understand mixing. We will be considering here turbulence levels small enough that they do not destroy the basic irrotational vortex pattern. A consideration of FIGS. 8 and 9 should clarify some of the points important with respect to understanding of the interaction between flow structure and molecular and turbulent diffusive mixing. It should be emphasized that the graphical illustration of FIG. 7, FIG. 8, and FIG. 9 are exemplary only. However, the examples are important ones. FIG. 7 shows a streamline 154 of a vortex from an outside radius 150 to a sink 152 where the streamline obeys the flow equations previously discussed. This flow streamline would occur, for example, in an irrotational flow vortex where the streamline was well away from entrance condition perturbations and where turbulence in the vortex was zero, if one were at point 156 to introduce, for example, ink into a water vortex and watch the ink line as it flows towards the sink. The streamline, in other words, shows what the flow path would be in the absence of any random mixing, either by turbulent diffusion or by molecular diffusion. If there were any diffusion, the width of the line would increase as it flowed inwardly towards the sink, as should be clear to those who understand mixing. In summary, FIG. 7 would show a flow streamline for an irrotational flow vortex if a line of mixant was introduced at only one point along the outside of the vortex and in the absence of either molecular or turbulent diffusion.

FIG. 8 shows what would happen if the same flow situation as that of FIG. 7 had an additional line of mixant introduced 180° around from the initial point of introduction. The vortex would have an outside circle 157 and a sink 158. At point 160 along the circle 157 a line of mixant would be introduced 159. The numbers 159 are shown as the flow swirls in towards the sink to identify that streamline. 180° from point 160 along circle 157 mixant is introduced at 162 and produces flow streamline 161. Flow streamline 161 is identified at several points to make it clear the manner in which the spiral 159 and the spiral 161 nest.

Again, FIG. 8 illustrates what would happen in a mathematically perfect irrotational flow vortex with a sink, in the absence of either molecular diffusion or turbulent diffusion.

FIG. 9 is analogous to FIG. 8, except now, rather than having two nested spiral streamlines, mixant would be introduced evenly around 10 points around the circumference of the vortex; and therefore, 10 different spiral lines would nest as shown.

With respect to FIGS. 7, 8 and 9, it should be clear that the presence of small-scale turbulent perturbations and molecular diffusion would tend to thicken out the lines as they flow from the outside towards the sink of the vortex and therefore that the mixing pattern would be more and more homogeneous as the mixture flowed inwardly towards the sink of the vortex. For example, with respect to FIG. 9 it should be clear that only a relatively small spreading angle of the mixant lines (corresponding to a relatively small turbulence intensity) would so smear out the lines of mixant by the time the flow had spiraled from the outside of the vortex to the sink, that the mixture at the sink of the vortex would be very much homogeneous. With respect to the nesting of spiral streamline patterns shown in FIGS. 8 and 9, it should be pointed out that the mixing chamber 18 of the present invention will be evaporating mixture around the entire periphery 42 of the vortex. Because of the physics of the boundary layer turbulence on this outside wall, the flow structure will act to introduce the mixant (fuel), not just around 10 points around the periphery, but around an effectively infinite number of points around the periphery. This means that if the liquid is well distributed around the circumference of the vortex peripheral wall (a point which will be discussed subsequently), the mean distance across which diffusion needs to occur in order to achieve essentially perfect homogeneity at the vortex sink is very short.

A consideration of the turbulent or molecular diffusion differential equation should make clear that an n-fold decrease in the mean distance across which diffusion needs to occur, for a set interfacial area, will decrease the time required for equilibrium by a factor of n. But the effect is even stronger. Introduction of mixant from many points around the periphery of the vortex is tantamount to very vastly increasing the interfacial area across which diffusion can occur. Of course, this effect increases mixing rates too. Again, it must be emphasized that the flow streamlines shown in FIGS. 7, 8 and 9 are only exemplary. However, the geometrical relations with respect to mixing illustrated by these figures are extremely important and do not become less important as the flow streamline structures become more complex; for any given flow structure, the flow structure will serve to stretch out the concentration gradients of species to be mixed and therefore, the flow structure will dramatically affect the rate at which mixing proceeds. Mathematically, the flow structure, or non-random streamline pattern, can be thought of as a spatial transform of concentration fields as a function of time. There are flow transforms which are very conducive to mixing. The irrotational flow vortex is such a flow transform. However, it should be clear that many other flow patterns which are not exactly irrotational flows can also have flow patterns very much conducive to mixing. For example, the flow pattern in the vortex of the present invention will not be a perfect irrotational flow vortex. However, with respect to the spiral streamlines, it will differ from a conventional irrotational flow vortex only in that the ratio of tangential to radial velocity will not quite be constant as a function of radius for the real flow.

The actual flow patterns in the device have been tested with several Reynolds number models during development of the invention. Reynolds number modelling of the flow pattern produced by the present invention using water as the model and ink as tracer shows that the flow pattern which actually occurs in the system is much like an irrotational flow vortex and that the flow pattern is extremely conducive to mixing. In fact, when a single point mixant introduction (using ink from a syringe) was used, the mixing was so rapid that the flow looked effectively homogeneous well before the flow reached the outlet of the vortex. Consideration of the flow nesting relations in FIG. 7, FIG. 8, and FIG. 9 should make it clear that the mixing must have been even better for the multiple mixant introduction case in the real vortex where fuel is distributed around the circumference of the outer wall of the vortex. While it is recognized that a Reynolds number model operating on water with ink as a tracer and a plexiglass one-to-one model is not quite a perfectly analogous modelling (because the water is not compressible as the air is), the analogy is still a close one, and the mixing observed in the system was very, very intense, so that even significant decrements in mixing rates due to compressibility effects (which are not likely) would not affect the conclusion that the vortex flat pattern actually produced in the present invention system is extremely conducive to mixing. Boundary layer turbulence on the outside peripheral wall produces an effective multiple fuel point introduction characteristic for the evaporation process of the present invention. The combination of the fuel evaporation pattern, and the overall flow pattern produces mixing rates so fast that the mixture is effectively homogeneous at the mixer outlet.

An early plexiglass Reynolds number model was also used for modelling the evaporation and mixing process, taking into account compressibility. The experimental results were important ones, and the experiment should be repeated in the engineering development of any vortex mixer. Using a relatively conventional carburetor pressurized by shop air so that the volumetric flow rates and Reynolds numbers through the vortex channel could be controlled to be in the range of those characteristic of an operating engine, water was introduced to the vortex. As expected, the water droplets were driven and deposited onto the outside peripheral wall of the vortex chamber. The flow pattern meant that water could only leave the vortex chamber by means of evaporation into the air which passed out the central outlet of the device. With a thermocouple at the peripheral wall of the vortex, the temperature of the liquid at the wall was measured. This temperature exactly determined the vapor pressure of the water at the outside wall. Then the wet bulb and dry bulb temperature of the air leaving the vortex chamber was measured. This determined the vapor pressure of water in the outlet air. It was found that: (1) for steady-state conditions, there was no detectable difference in either the humidity or the temperature of the air exiting the vortex chamber outlet from radial position to radial position. (2) The vapor pressure of water in the air at the vortex chamber outlet was always more than 60 percent of the vapor pressure of the water inside the vortex at the peripheral wall. Under many conditions, the vapor pressure at the outlet was more than 75 percent of the liquid water vapor pressure. A number of different flow conditions were run to collect this data. Consistently, the smallest fractions of the water vapor pressure occurred under flow conditions analogous to wide-open throttle type engine operation.

The water evaporation experimental sequence shows a great deal about the mixing and evaporation rates in the vortex system. First, mixing in the vortex had to be very excellent indeed, even down to microscale volumes. Since the flow system could not produce supersaturated vapor, the worst mixing situation would be one where the vortex generated 60 percent plus saturated vapor with the balance dry air on micronic volume scales. Clearly, the turbulent conditions in the vortex had to produce a more mixed situation than this. However, it must be emphasized that even this "worst case" microscale heterogeneity would produce very excellent homogeneity for volume samples of the order of a cylinder displacement volume. There is reason to believe that the standard deviation of concentration would be very small on any scale which could be conveniently measured.

Secondly, the experiment strongly indicates that the wall temperature in a vortex mixer operating in an engine burning gasoline would need to be only a little hotter than the equilibrium air distillation temperature corresponding to the intake manifold pressure and mixture stoichiometry for a set engine condition, in order to completely evaporate, the fuel under steady-state, stead-flow conditions. If the peripheral wall of the vortex were operated at a temperature significantly higher than the equilibrium air distillation temperature corresponding to the mixture conditions, only a fraction of the peripheral wall would need to be wetted by the fuel in order to produce complete evaporation. This is practically important. The vapor pressure curves for most pure hydrocarbons are such that an 100° F. increase in temperature increases vapor pressure by roughly a factor of 6 (5 to 7). Suppose the peripheral wall was heated to a temperature 100° F. above that of the equilibrium air distillation temperature of the mixture (which is often below 140° F.). This would mean that if the entire peripheral wall of the vortex were wetted with gasoline, a roughly 6 times stoichiometric mixture would be produced by the vortex (for equilibrium reasons most of this fuel would recondense as smoke-sized particles, but this fact is of little interest to the present argument).

The evaporation time of the fuel under these conditions would have to be very fast. The following equilibrium argument shows why the equilibrium process is fast. Consider the equilibrium situation of the vortex as an evaporator receiving a set fuel-air ratio. If too much of the peripheral wall is wetted by fuel, fuel will evaporate off the wall faster than fuel is deposited onto the wall from the carburetor, and the wall will tend to dry out. For similar reasons, if less of the wall is wet than that required for steady-state conditions, fuel will be deposited on the wall faster than fuel is evaporated, so the surface area of the wall wet by fuel will increase. Because the wall is continuously and vigorously sprayed with fuel droplets from the inlet passage and also with condensing droplets which are too large to flow through the centrifugally separating vortex flow field, a too dry wall will be wet to equilibrium very fast. Evaporation and flow relations are such that a too wet wall will evaporate to equilibrium wetness very fast. The equilibrium fuel evaporation process for a hot vortex surface and a strong flow pattern is therefore very fast.

For an appreciation of how rapidly droplets above 5 microns must deposit on the vortex wall, see Environmental Protection Agency report under Contract No. EPA-70-20 "A Study of the Influence of Fuel Atomization, Vaporization, and Mixing Processes on Pollutant Emissions from Motor-Vehicle Power Plants,". Both the phase-one and phase-two reports were conducted by Battelle Labs. In a strong vortex flow field droplets so impacted need not stick to the vortex chamber peripheral wall, but may splash in such a way as to form a "splash cloud" of fuel droplets rotating around the outside of the vortex at velocities near the velocities of the vortex airflow itself. Such a splash cloud distributes fuel droplets around the vortex peripheral wall quite evenly. When the peripheral vortex wall is hot enough to boil the lighter ends of the fuel this sort of splash cloud forms readily for a properly designed vortex mixer. If only one-sixth of the vortex peripheral wall needs to be wetted by the fuel, the equilibrium amount of fuel in the splash cloud around the peripheral wall of the vortex will be quite small, and the mean transit lag of evaporation (the time lag between fuel passage through the vortex and air passage through the vortex) will be of the order of 50 milliseconds or less.

The inventors have observed a vortex mixer operating on an engine on conventional gasoline, by looking inside the vortex mixing chamber through a viewing window such as will be described with reference to FIG. 12. Fuel was introduced just upstream of the main vortex flow field by means of an injection nozzle. The window made it possible to see the bottom and peripheral walls of the vortex mixer. When the peripheral vortex wall analogous to wall 42 was more than 20° C. above the equilibrium air distillation temperature characteristic of the operating mixture, it was not possible with the naked eye to detect any trace of liquid phase in the vortex mixer, even though liquid phase was present in a splash cloud around the vortex peripheral wall. Neither the shininess characteristic of wetting nor any blurring was visible to the eye, testifying to the physical reality of the splash cloud. Thermocouple readings around this vortex peripheral wall made it clear that evaporative heat transfer was occurring all around the peripheral wall, again demonstrating the reality of the splash cloud. The set-up described above had fairly sensitive instrumentation attached to it. With this instrumentation the evaporation lag in the hot vortex and the cylinder to cylinder A/F variation were both too small to be detected. When the vortex was near or below EAD temperature, lags were of course detected. The present invention vortex system very much reduces the time lag of the fuel with respect to the air. This is a substantial practical advantage of the current device. It should be clear that the time lag of the system will be the less, the greater the surface temperature about the peripheral wall of the vortex (the greater the excess of the surface temperature over the equilibrium air distillation temperature required for the particular fuel and stoichiometry on which the engine operates), and the stronger the vortex flow pattern.

The above argument refers to the vortex flow passage per se. No matter how short the lag in the vortex chamber itself, significant fuel lags can exist in the entrance section passage, and the system lag will depend on how fuel is introduced into the vortex chamber. With decent understanding of the fluidics of the flow, very short lags are attainable.

A designer of a vortex system should pay great attention to Reynolds number modelling. Reynolds number modelling with air and water is useful for predicting evaporation lags, as was discussed above. (An advantage of water and air is that they are non-toxic and non-flammable). In addition, Reynolds number modelling in a vortex mixer fabricated of transparent material with water as the working fluid and with ink injected at various points through syringe needles as tracer will give an appreciation for the details of the flow pattern which can be obtained in no other way. A skilled fluid mechanics man, working with a Reynolds number water model of a specific vortex system will be able to quickly see any fluid mechanical problems which occur and should be able to correct them. Reynolds number modelling with water is indispensible because it permits direct visualization of the (inescapably somewhat complex) flow patterns. A Reynolds number model useful for water studies can be readily fabricated out of acrylic plastic or other transparent plastic. Simple pressure gauges and water flow gauges will permit Reynolds number analogies to be established. The water model technique can also be made to yield mixing statistics data by injecting salt water into the system at known points and then detecting the electrical resistance of the water somewhere downstream from the mixant introduction with a simple ionic probe (linked to a square wave generator to eliminate ionic corrosion drift). The ionic probe technique gives resolution of mixing statistics down to volumes of cubic millimeters or even smaller volumes.

It should be relatively clear to skilled automotive engineers, and certainly to anyone skilled in the art of fluidics, that the efficiency of the vortex mixer is largely dependent on the fluidic efficiency of the vortex entrance section leading in to the vortex flow chamber per se. This fluidic efficiency is defined as the fraction of the isentropic velocity past the throttling restriction delivered tangentially nd in coherent form to drive the vortex in the vortex mixing chamber (for example, mixing chamber 18 of FIGS. 1 and 2). The high speed flow from the air controlling throttle is desired along the vortex walls roughly parallel to the vortex outlet central axis 35, and not along the vortex walls perpendicular to the vortex outlet central axis. For fluidic reasons discussed previously, a particularly convenient place for the wall attached streams driving the vortex is in the corners of the inlet section, since wall attached streams in corners of channels decay relatively slowly. So long as step up is avoided, the fluidics in a rectangular throttle entrance section such as that of FIG. 3 is relatively straight-forward. The fluidics in a round throttle to trapezoidal entrance section channel is more complicated, and it may be useful to set up an experimental arrangement wherein shop air is delivered to the throttle plate, and the velocities of the flow field at the plane of AA in FIG. 1 are analyzed by means of Pitot tubes. A yet better alternative would be an arrangement for Pitot tube testing of a flow channel such as that shown in FIG. 5. With simple Pitot tubes made from disposable syringes, a few inclined manometers and proper measurement of the pressure drop across the throttle plate, useful flow maps of a proposed inlet section can be made. Such flow maps can be extremely useful in the perfecting of the flow details in an entrance section analogous to that shown in FIGS. 4 and 5.

The basic functioning of the present invention device should by now be clear, and it should be relatively clear that the function of the device rests on the interaction of evaporation, molecular diffusion, turbulent diffusion, and the gross effects of the flow structure. However, it should be said that the flow structure which is most desirable requires a bit of design care. The passage where the flow is introduced having angular momentum about the channel outlet and where the passage is shaped to minimize momentum loss in the system has been in existence for a long time. For a detailed discussion of vortex devices, see Chapter 8 of *Design Theory of Fluidic Components* by J. M. Kirshner and Silas Katz, Academic Press, 1975. FIGS. 10 and 11 are taken from page 281 of this book and show the flow pattern which can be produced if the circumferential weirs 41, such as are shown in FIG. 1 and FIG. 2, are not used. FIG. 10 is a view of the flow perpendicular to the axis of rotation of the vortex, the FIG. 11 is a diametral section showing streamlines for the flow of FIG. 10. What is called the developed region (or doughnut) is caused because of a boundary layer effect. The centrifugal forces in the flow in the vortex are important to determining the flow pattern. Centrifugal force is proportional to $r\dot{\theta}^2$, and is therefore proportional to velocity squared. At the top and bottom surfaces of the vortex-containing channel, viscous forces slow down the flow in and near the boundary layer. This means that the centrifugal force in the vortex near the wall is much less than it would be in the center, and the result is that the radial velocity of flow towards the sink is greater near the walls of the vortex than it is in the vortex center. The effect is so large that the recirculating doughnut flow shown in FIGS. 10 and 11 often occurs. One of the difficulties is that this doughnut flow diameter will vary with the Reynolds number at which the device is operating and as the ratio of radial velocity to tangential velocity varies and so can produce unfortunate modal characteristics with respect to the mixing device. Clearly, the simple irrotational flow vortex flow form is a preferable flow form. It has better mixing rates, it is simpler and its equations are not modal, so that the irrotational flow vortex will be stable above a certain minimum Reynolds number. It happens that this minimum Reynolds number is lower than any Reynolds number which would occur in an operating engine. To achieve this approximation of the irrotational vortex flow pattern, it is necessary to condition the boundary layer flows.

This boundary layer control can be obtained with circumferential weirs such as 41 shown in FIG. 1 and FIG. 2. FIG. 12 shows the flow pattern which is produced due to these weirs where FIG. 12 is a diametral half section of a vortex channel such as that shown in FIG. 14 and shows the velocities with respect to the radial direction (it should be clear that very significant tangential velocities, which are not shown in FIG. 12, also exist in and out of the pattern). The effect of the circumferential weirs 81 is to stabilize small vortical flows between the weirs in such a manner that the effective boundary layer flow is well lubricated and where the great bulk of the flow energy in the vortex is in the form of a simple irrotational vortex flow. This has an advantage with respect to the transfer characteristic of the device because with the flow in an irrotational flow mode the statistical variation in transit time from fluid element to fluid element can be held to a minimum; this is useful for servo-mechanical design, particularly for systems such as 3-way catalyst systems. It should be emphasized that the device will produce significant mixing without circumferential weirs such as 81. However, operation with the weirs is preferable.

FIG. 12 shows an enlarged sectional view of a vortex mixer such as that shown in FIGS. 13 and 14, with the addition of a transparent window 84 on the top of the vortex outlet. Window 84 makes possible the viewing of the vortex mixer flow channel below the point roughly corresponding to point 86, during actual operation of the vortex with a running engine. The window, therefore, made possible viewing of the bottom of the vortex, including the weirs, as well as a considerable portion of the vortex peripheral wall. In the setup where the window was installed experimentally, the window also made it possible to see the volume in space into which the injection nozzle was directly injecting fuel. Viewing the operating vortex through window 84 was extremely revealing. When the vortex was cold, during start-up, liquid fuel would accumulate around the outside peripheral wall of the vortex and a small amount of liquid fuel was visible between the weirs 81. This liquid fuel between weirs 81 served as a flow tracer, and made it clear that the flow between the weirs and the operating vortex was very much like the flow between weirs 81 shown in FIG. 12. Liquid striations showed the general spiraling pattern between weirs. The liquid accumulated along the outside of the weirs, at a maximum radial distance from the vortex outlet center, as would be expected for the weir boundary layer conditioning flows shown in FIGS. 12 and 12a. This visual evidence, in combination with analogous evidence obtained with ink in a water Reynold's number model, is extremely good evidence that the flow field is as shown in FIG. 12. In addition, when the vortex mixer was warmed so that its peripheral wall temperatures were more than 20° C. hotter than the equilibrium air distillation temperature of the fuel air mixture delivered to the engine, it was not possible, viewing through the observation window, to see any visually identifiable trace of liquid phase within the view field corresponding to the zone below point 86 in FIG. 12. This visual data, in combination with thermocouple readings demonstrating that evaporation was occurring all around the peripheral wall of the vortex, constitutes strong evidence for the reality of the splash-cloud fluid mechanics discussed previously. It is easy enough to insall an observation window analogous to 84, and easy enough to view the actual vortex mixer chamber through deflection vanes 82. It is therefore a worthwhile check on vortex operations to install such an observation window in any serious vortex development program. Generally, the temperatures of the vortex are low enough that the observation window may be readily fabricated of acrylic plastic, and sealed with O-ring type seals.

The vortex mixing chamber shown in FIGS. 1 and 2, in combination either with the entrance geometry shown in FIG. 3 or with the entrance geometry shown in FIGS. 4 and 5, is the preferred form of the vortex mixer invention. With the mixer shown in FIGS. 1 and 2, all of the throttling pressure drop across the air-flow controlling throttle is available to drive the flow patterns of the vortex mixer. For an entrance section similar to that shown in FIGS. 4 and 5, the mixer of FIGS. 1 and 2 can be adapted to a side-draft type of carburetor. However, the arrangement shown in FIGS. 1 and 2 is not adaptable to the more conventional sort of downdraft carburetor.

In the arrangement shown in FIGS. 13 and 14, the fluid mechanics and structure is in many ways analogous to the fluid mechanics and structure already shown and discussed with reference to FIGS. 1 and 2. To emphasize the correspondence of the parts, the numbers in FIGS. 13 and 14 are two hundred series numbers with the last two digits corresponding to the two digits of the analogous part referred to in FIGS. 1 and 2. For example, weirs 41 in FIGS. 1 and 2 correspond to weirs 241 in FIGS. 13 and 14.

See FIG. 13. The vortex chamber per se 218 of FIGS. 13 and 14 corresponds in all details to the vortex chamber per se 18 in FIGS. 1 and 2. The vortex mixer chamber 218 discharges into outlet 232 which is connected to an intake manifold (not shown) as before. Vortex chamber peripheral wall 242, weirs 241, outlet 232 and outlet deflector vanes 234 each function in a manner analogous to the corresponding parts in FIGS. 1 and 2. However, the mixer of FIGS. 13 and 14 differs from that shown in FIGS. 1 and 2 with respect to the entrance section geometry, although significant fluid mechanical analogies between the two sorts of entrance geometries are readily apparent. In FIG. 13, the entrance section geometry is adapted to receive an intake of fuel-air mixture from a conventional down-draft two barrel carbuertor (not shown) at openings 250. The flow from the carburetor flows past openings 250 into entrance source chamber 201, which is heated and inside which a significant amount of fuel evaporation occurs. Mixture from chamber 201 flows past a curved throttle plate 204 pivotting on shaft 205 and linked to the throttle linkage of the carburetor (not shown). The linkage between throttle 204 and carburetor must be arranged so that the pressure drop across throttle plate 204 is enough to drive a strong vortex, but still a low enough pressure drop to be tolerable with respect to the metering characteristics of the carburetor. This carburetor metering constraint on the linkage relations which control throttle 204 generally limits the pressure drop across throttle 204 to something less than 5 inches of mercury pressure drop. Throttle 204 is a curved roughly trapezoidal throttle plate with parallel top and bottom sealing surfaces. On the edge labelled 210 of throttle 204, at the bottom (not shown) is a notch (not shown) large enough to produce a pressure drop of only a few inches of mercury under conditions when the carburetor supplying entrance passages 250 is in its idle configuration. Flow past this notch attaches to a corner of the entrance section and flows into the vortex in a manner which has already been discussed with reference to FIGS. 1, 2, 3, 4 and 5. Provision of this notch, which arranges for the bulk of the idle flow to flow into the vortex chamber as a wall corner attached stream, produces a stronger vortex in vortex chamber 218 under idle and off idle conditions than would occur without the notch.

A major difference between the mixer shown in FIGS. 13 and 14 and the mixer shown in FIGS. 1 and 2 is that the downdraft carburetor mixer of FIGS. 13 and 14 requires heating of the surfaces of entrance 201. To control lags, fuel air mixture in entrance 201 must be heated as it flows from opening 250 to the gap controlled by throttle plate 204. For this reason, exhaust heated fins are arranged all the way around the vortex mixer, and the entrance section is curved to allow this circumferential heating. To provide uniform heat exchange from the heat exchanger fins to a portion of wall 242 and a portion of the chamber wall of entrance section 201, heat piped heat exchanger passage 254 is provided. This passage contains a small volume of water, but is otherwise evacuated so that the only gas within the chamber is water vapor. Because of this, the liquid interface of water inside 254 is always at its boiling and at its condensation temperature. The equilibration of temperature within passage 254 is therefore very fast. If any surface of passage 254 is cooler than the water interface, water vapor will rapidly condense upon it, providing heat of vaporization heat transfer to this cooler surface. Similarly, if any part of the liquid contracting surface of the passage 254 is hotter than another surface on 254, water at this hot surface will boil, providing very rapid heat transfer from the hot (evaporating) to the cool (condensing) surface. The result of this is that heat transfer within the volume of passage 254 is extremly rapid. Therefore the temperature of the surfaces of the passage 254 is quite uniform. Heat pipe passages analogous to that of 254 are quite convenient in providing uniform heating to extended surfaces, and are useful in the heat exchanger design for a vortex mixer.

The mixer shown in FIGS. 13 and 14 has some disadvantages in comparison to that shown with reference in FIGS. 1, 2, 3, 4 and 5. First, there is a fuel lag in entrance source chamber 201 and this introduces a perceptible, through relatively small, lag in the system no matter how fast the mixing relationships downstream of auxiliary throttle 204 may be. Secondly, the mixer of FIGS. 13 and 14 involve an additional air throttle 204 downstream of the air flow throttles already provided with the down-draft carburetor, and the carburetor throttles and the auxiliary throttle 204 must be carefully linked if proper carburetor metering is to be maintained. Also, the requirement that the entrance section be heated complicates heat exchanger arrangements. However, the vortex mixer described in FIGS. 13 and 14 works very well. Experimental results obtained on a mixer similar to that shown in FIGS. 13 and 14 will be discussed later.

The vortex mixers shown in FIGS. 1, 2, 3, 4, 5, and 13 and 14 stabilize vortices inside their mixing chambers 18 or 218 which are excellently approximated as irrotational vortex flows. However, vortex mixers involving a less perfect vortex flow field also function and produce excellent mixing. The first vortex mixer which the inventors actually operated on a multi-cylinder engine is illustrated in FIGS. 15, 16, 17 and 18. FIG. 15 is a diametrical cross section of the mixer, involving a section through the central passage of a one venturi down-draft type carburetor. FIG. 16 is a top plan view of FIG. 15 taken along sectional line 16—16 with the top of the device removed to show the disposition of the angular weirs and deflectors. FIG. 17 is a sectional of the carburetor and its corresponding deflectors 342 and 343 along sectional line 17—17 of FIG. 15. FIG. 18 is a view of deflectors 342 and 343 along sectional line 18—18 of FIG. 17.

Many of the fluid mechanical characteristics of the mixer shown in FIGS. 15 to 18 should be clear to the reader. High velocity flow past the throttle valve 344 is deflected by deflectors 342 and 343 and introduced tangentially at a significant radial distance from the center of the mixing chamber. This tangentially introduced flow drives a generally vortical flow pattern in the mixer, which flows to the outlet 320 in an inwardly spiralling fashion until it reacts with deflector vanes 348. In the outlet passage of the mixer is faired portion 346, which somewhat reduces the flow resistance of the vortex mixer but is a less efficient flow resistance reducer than the optional variable spoiler assembly 36, 38, 40 shown in FIGS. 1 and 2. The fluid mechanics of the mixer shown in FIGS. 15, 16, 17 and 18 is analogous to that previously discussed with reference to FIGS. 1, 2, 3, 4, and 5, in that it is somewhat sensitive to fluid mechanical details. Specifically, the arrangement of the deflector vanes 342 and 343 (and specifically the setback y of deflector 343 shown in FIG. 17) is quite important to the function of the device. The inventors found experimentally that if these deflectors were carefully designed, the tangential flow driving the vortex would be sufficiently high in velocity and low in turbulence to establish a flow field much like an irrotational vortex in the mixer. When this approximately irrotational flow vortex was present, mixing was excellent in the vortex device. However, if details of the design of the deflectors 343 and 342 were not proper, the turbulence of the flow delivered into the vortex chamber was sufficiently high that the swirling flow within the vortex chamber decayed into a flow pattern approximating a rotational vortex where the angular velocity of the streamlines was approximately constant along the radius from the vortex outlet center. Mixing rates with this rotational vortex were drastically less than those which occurred with the irrotational vortex, for reasons which should be clear upon reconsideration of FIGS. 6, 7, 8 and 9.

FIGS. 15 and 16 show a number of additional features. The heat exchanger passage 334 includes within it heat resistant insulated material 339 to assist the warm-up characteristics of the vortex mixer. In addition, electrical resistance air heating wires 310 are shown schematically upstream of the choke of the carburetor 326. For a mixed boiling point fuel including light boiling components a cold-starting mixture can be achieved by choking until a sufficiency of light end components are available in the vortex chamber to produce an ignitable mixture for cold start-up. However, for pure compounds, the maximum air fuel ratio is proportional to the vapor pressure of the pure compound fuel as a function of temperature. Below a certain temperature the compound vapor pressure is too low to evaporate an ignitable mixture, no matter how much liquid phase is in contact with the air for evaporation. Therefore, for an engine equipped with a vortex mixer (which eliminates liquid phase flow to the engine), there exists a minimum start-up temperature for any pure compound fuel unless there is provision for heat addition at start-up. The electrical air resistance wires 310 do provide this heat addition for start-up. The load on the battery required for this start-up means is moderate, and the vortex chamber rapidly heats up by exhaust gas flow after engine light-off, so that electrical resistance wires 310 do constitute a practical arrangement for cold starting of a vortex mixer.

With a vortex mixer of FIGS. 15, 16, 17 and 18, the mixing is good enough that air fuel ratio variations from cylinder to cylinder was undetectable experimentally under many conditions. However, the disadvantages of this arrangement with respect to wide-open throttle flow resistance and fuel evaporation transient response motivated the development of the vortex mixers described in FIGS. 1–5, 13 and 14.

Mixing Matters for Emissions and Fuel Economy

A perceptive man skilled in the automotive engineering arts may have concluded at this point in the disclosure that the inventors are guilty of overkill, since they have disclosed means to mix fuel and air on much finer scales than the scales which would be required to achieve essentially perfect cylinder-to-cylinder air fuel ratio distribution. It is the conventional wisdom in automotive engineering that mixing only matters insofar as it generates relatively tight cylinder-to-cylinder mixture variation. However, the inventors have worked for a long time in the area of super homogeneous charge very lean engine combustion, and have shown that significant advantages are available if very homogeneous mixtures are burned very lean in an internal combustion engine. The fuel economy and emission control advantages of mixture homogeneity will be partially explained with reference to FIGS. 19 and 20.

FIG. 19 is a mathematically derived numerical example used to make clear a basic statistical argument. FIG. 19 plots three different gaussian distributions, curve A, curve B, and curve C, each of which has the same total area under the distribution curve, but with the curves having different standard deviations. The curves plotted are for gaussian distribution (reasonably mixed systems are nearly gaussian) where the sample size of the distribution is so large that the curve is continuous and smooth. For microscale mixing discussions, the smooth distribution (high population approximation) is well justified. FIG. 19 attempts to show in a visually clear way that the lean limit of satisfactory engine combustion shifts leaner (approaching the lean limit for perfect mixing) as the mixture becomes more and more homogeneous. An engine with excellent mixing will operate smoothly and efficiently on mixtures very much leaner than would be tolerable for an engine with inferior mixing. The details of the argument with respect to FIG. 19 will follow later. However, the importance of mixture homogeneity, and the emission advantages which mixture homogeneity permits, are made more clear with respect to the data plotted in FIG. 20, which shows that the nitrous oxide outputs available with very homogeneous combustion are very low under conditions where engine efficiency is optimal.

FIG. 20 plots data taken by the inventors at the ENGINE RESEARCH LABORATORY of the University of Wisconsin Department of Mechanical Engineering under the close supervision of Professors P. S. Myers and O. A. Uyehara. This data also is presented as FIG. 60 of a co-pending patent application by Robert Showalter. All data points in FIG. 20 are for minimum best torque spark advance. The work plots nitrous oxide per indicated horsepower hour (as grams $NO_2$ per indicated horsepower hour) versus the equivalence ratio of mixture burned for three different mixing cases. In the first case, the propane fuel was introduced into the intake port of the test engine and flowed past a rather conventional intake port and intake valve arrangement into the engine combustion chamber, where it was burned. In the second case, fuel was introduced at the intake port and flowed past a variable flap restriction which fluidically controlled the flow energy and flow pattern in the combustion chamber (in fact producing an irrotational vortex in the combustion chamber) so that mixing was quite good at the time the spark lit. In the third case, the fuel air mixture was fed to the engine with the variable restriction flap arrangement, but was in addition mixed prior to introduction past the flap with a primitive early vortex mixer design developed by the inventors. Since the fuel for these tests was propane, this vortex mixer was unheated. The nitrous oxide output level plotted in FIG. 20 covers a range of more than a thousand to one, and for this reason the $NO_x$ level is plotted on a logarithmic scale against equivalence ratio.

It may be worthwhile to relate the concept of equivalence ratio to the somewhat more commonly known concept of air-fuel ratio. Equivalence ratio is defined as the ratio of the stoichiometric air-fuel ratio to the actual air-fuel ratio. The test data of FIG. 20 is for purpose. However, the $NO_x$ formation with gasoline is very similar to what occurs when burning propane. Plotting equivalence ratio versus airfuel ratio for gasoline gives the following correspondences:

| EQUIVALENCE RATIO | AIR-FUEL RATIO FOR GASOLINE |
| --- | --- |
| 1.0 | 14.7 |
| .9 | 16.3 |
| .8 | 18.4 |
| .7 | 21.0 |
| .6 | 24.5 |

FIG. 20 graphs variation of $NO_x$ output versus equivalence ration with the $NO_x$ output expressed as grams $NO_2$ per indicated horsepower hour on a logarithmic scale, since the $NO_x$ output varied by more than a factor of a thousand over the range of the equivalence ratio plotted. The ordinate of the graph is equivalence ratio, as defined above. In FIG. 20 it is shown that $NO_x$ output is an extremely strong function of equivalence ratio, and that the relationship between equivalence ratio and $NO_x$ output is extremely steep in the very lean range. FIG. 20 also shows that with excellent mixing the optimal fuel consumption air-fuel ratio shifts leaner and to a lower $NO_x$ output value. The data show that the better the mixing, the better the efficiency and the lower the $NO_x$ output corresponding to the optimal equivalence ratio.

All the equivalence ratios plotted in FIG. 20 are leaner than the stoichiometric ratio. However, all the mixtures which are relatively near the stoichiometric ratio will be referred to as relatively rich ratios.

In FIG. 20 it is shown that at the relatively rich ratios characteristic of conventional engine operation, there is not much advantage to extreme air-fuel mixing homogeneity. Between an equivalence ratio of 1.0 and 0.8 stoichiometric, the difference in $NO_x$ output between the various mixing-state cases is not particularly large, nor are the differences very convincing. However, in the range leaner than 0.8 equivalence ratio, the situation changes drastically. For the case of conventional port fuel injection (the no port flap restriction case) the best fuel economy happens at an equivalence ratio of 0.735, so that enleanment beyond this point results in quite significant fuel economy penalties (which could not be shown in this graph, which identifies fuel consumption only at optimal points). From the equivalence ratios at very leanest limit where engine operation was possible with this low mixing arrangement (0.59 equivalence ratio for the conventional mixing case) to the stoichiometric air-fuel ratio, there is only a little more than a factor of 10 change in $NO_x$ output in the conventional mixing-state case which corresponds to the wide open flap data. Furthermore, most of this $NO_x$ range involves a fuel consumption penalty. The optimal indicated specific fuel consumption level for the conventionally set-up engine mixing case involves $NO_x$ outputs of almost half of the maximum $NO_x$ outputs for this engine under the conditions shown in the graph. It is results like these for conventionally set-up engines which have convinced the automotive engineering profession that $NO_x$ control via charge dilution is a relatively unattractive approach incapable of producing the very low $NO_x$ output levels which are required by the Federal government beyond the 1981 model year.

In the equivalence ratio range leaner than 0.8 equivalence ratio, the $NO_x$ performance of the engines equipped with better mixing is drastically better than that of the conventionally mixed engine. Quite clearly, for a set equivalence ratio leaner than 0.8 equivalence ratio, the variable restriction engine with its superior in cylinder mixing had significantly lower $NO_x$ levels. For example, for the case plotted called the 0.300" flap restriction port injected case, the optimal fuel consumption (minimum indicated specific fuel consumption point) occurred at an equivalence ratio of 0.59 equivalence ratio at an $NO_x$ ratio of 0.27 grams per indicated horsepower hour. This represents a 48 fold reduction in $NO_x$ level from the maximum for the variable restriction engine, in contrast to only a 2.4 fold reduction in $NO_x$ output from the maximum for the conventional engine set-up when comparing the fuel consumption optimal $NO_x$ output to maximum $NO_x$ output. In addition, the fuel consumption (and therefore the efficiency) with the variable restriction engine was significantly and reproducibly better than the fuel consumption with optimal settings for the engine with conventional levels of mixing so that the drastic reduction in $NO_x$ was obtained with a simultaneous (although relatively small) improvement in the fuel economy of the engine. The advantages of mixing to very complete levels of homogeneity are shown even more dramatically for the case where the variable restriction port engine was supplied with a mixture homogenized by a vortex mixer. In this case the optimal indicated specific fuel consumption is even lower than before, and the reduction in the $NO_x$ from the maximum is a very large factor of 420. The relationship between equivalence ratio and $NO_x$ characteristics of the engine described in FIG. 20 is extremely close to that predicted by chemical kinetic calculations. The small range of $NO_x$ reduction characteristic of a conventional mixed engine is due to incomplete mixing.

Careful consideration of FIG. 20 should make several points clear. First, in the very lean range mixing has a strong effect on both efficiency and $NO_x$ output. Secondly, with very homogeneous combustion quite low $NO_x$ outputs are attainable if mixing is good enough and the air-fuel ratio delivered to the engine is properly programmed. The reasons for the $NO_x$ versus equivalence ratio relationship shown in FIG. 20 involve the interaction of chemical kinetics and mixing statistics. Chemical kinetics do not need to be discussed in this case. However, if a designer is to take advantage of the emissions and efficiency control improvements made possible with the vortex mixer, he must understand certain statistical issues. FIG. 19 is an attempt to illustrate these statistical issues.

It should be pointed out that the data of FIG. 20 relate to an engine where the structure of the flow within the combustion chamber itself was controlled, and that the mixing-state within the combustion chamber was more homogeneous than could be achieved with a vortex alone. A vortex, no matter how well it mixes fuel and air, cannot affect the details of flow structure within the combustion chamber itself and cannot mix residual gases within the combustion chamber with the fresh charge air-fuel mixture. The inventors believe that it would be possible using the mixing vortex and the variable restriction port in combination, to build engines having optimal efficiency with $NO_x$ levels comfortably below the 0.4 grams $NO_x$ per mile emission level. However, the vortex mixer used alone with proper fuel air ratio programming appears to have the potential passing the 1.0 gram per mile $NO_x$ standard with lean combustion and in a trim involving significant fuel economy advantages in comparison to conventional pre-emission control engines and also advantages with respect to three-way catalyst equipped engines. The vortex makes these good results possible by producing extremely homogeneous fuel air mixing.

FIG. 19 gives a graphical explanation of how improved mixing within the combustion chamber of an engine can widen the equivalence ratio of dilution limits (EGR limits) which permit stable and efficient combustion. FIG. 19 illustrates microscale mixture sample variations in a hypothetical engine where the gross air-fuel-residual ratio from cycle-to-cycle or cylinder-to-cylinder is fixed but where the mixing inside any given cylinder is imperfect. Curve A, B, and C of FIG. 19 plot distributions for microscale mixing sample volumes, where the number of sample volumes in each distribution is very large so that the smooth gaussian distribution shown is produced. It should be emphasized that the curves of FIG. 19 illustrate a numerical example of a statistical argument, and do not constitute the results of measurement. Looking at FIG. 19, suppose that if the mixture within the spark plug gap in the engine is leaner than 0.55 equivalence ratio at the time of sparking, then misfire will infallibly occur (this is a worthwhile over simplification for present purpose). Since there are about $10^5$ spark plug gap volumes in one cylinder volume, the continuous gaussian distributions shown are reasonable.

The areas under curves A, B, and C are equal. Curve A has a mean equivalence ratio of 0.75, but has a standard deviation of 0.1 equivalence ratio for its distribution. Under the assumption that the fraction of the population of curve A leaner than 0.55 equivalence ratio will represent the misfire frequency, this mixture A will misfire in the engine about 2.25% of the time; by usual standards distribution A can be said to be at its lean misfire limit at a ratio somewhat richer that 0.75 stoichiometric. The standard deviation of the mixture plotted on curve B is half the standard deviation of curve A, or 0.05 equivalence ratio. A 2.5% misfire rate for distribution quality B occurs at an overall equivalence ratio of 0.65 stoichiometric, and so an engine with mixing such as that shown for curve B will have a misfire limit richer than 0.65 equivalence ratio.

Curve C is shown with a standard deviation of 0.01 equivalence ratio and with the overall equivalence ratio of the mixture at 0.585. The mixture of curve C is much leaner than that of curve A or curve B, but because of curve C's tight mixing statistics, a mixture leaner than 0.55 equivalence ratio will occur in the spark gap less than 1/10th of 1% of the time. Mixture distribution C, with its mean at 0.585 stoichiometric, will have a misfire rate 25 times less than the misfire rate distribution of curve A even though curve A has a mean equivalence ratio of 0.75 equivalence ratio, and distribution C will also have a misfire rate only 1/25th as great as that of distribution B with its mean ratio of 0.65 stoichiometric. Better mixing (tighter statistics) than that shown in curve C would permit the misfire limit to be approached even more closely with satisfactory engine smoothness. Tightening mixture distributions in the cylinder permits a much closer approach to the ultimate physical misfire limits than can be achieved with less complete mixing. Satisfactory operation with very lean mixtures requires extremely tight microscale statistics.

The data of FIG. 20 should become more clear in light of the previous statistical explanation. Tight mixing makes operation with significantly leaner mixtures possible. Moreover, because the slope of the $NO_x$ production curve as a function of equivalence ratio is so steep in the lean range, $NO_x$ output of a lean overall air-fuel ratio mixture is much lower if the microscale mixing distribution is tight than if the mixing is loose. The reason that tight microscale mixing is advantageous in the lean regime is that the $NO_x$ outputs for small volumes which are richer than the mean for an overall lean mixture are very much higher than the $NO_x$ outputs corresponding to the mean ratio, so that there is an extremely non-linear averaging resulting in heavy penalties for incomplete homogeneity.

The microscale mixing argument just given assumes essentially perfect cylinder-to-cylinder mixture variation, and also assumes a steady fuel-air input so that fuel-air ratio does not vary much under steady-state conditions from one cycle to another. However, in practical engines neither of the assumptions may be justified. Looking at the extreme sensitivity of $NO_x$ output to equivalence ratio in the lean regime, it should be easy to appreciate the importance of stable steady-state fuel air ratios from cycle-to-cycle, and the importance of tight air-fuel ratio delivery cylinder-to-cylinder, if minimum nitrous oxide outputs are to be practicably achievable. With a well-designed vortex air-fuel mixer, cylinder-to-cylinder air-fuel ratio variations for a steady fuel-air input are generally too small to measure and insignificant.

A properly designed vortex mixer has essentially perfect cylinder-to-cylinder fuel-air ratio delivery, and can be designed to deliver microscale fuel air mixing statistics much tighter than those shown in curve C of FIG. 19. These attributes give the vortex mixer the potential for very low emissions in the lean burn regime for a properly set up engine.

However, this very low $NO_x$ potential is contingent on a rather smooth fuel-air ratio delivery into the vortex as a function of time. The vortex mixer is an air-fuel mixing device with small transient lags for both the fuel and the air. It is not a fuel-air metering device. If, under steady-state conditions, air-fuel ratio delivered into the vortex varies as a function of time, the air-fuel ratio of the mixture from the outlet of the vortex will vary in nearly the same way as a function of time. For this reason, a smoothly continuous fuel-air metering into the vortex is desirable. This smooth fuel input can be achieved in a number of ways. Conventional carburetors, because of large air bubbles from the air bleed, produce unstable fuel air metering over short time periods. However, a small bubble air bleed system such as that of Toyota (See SAE Paper No. 760757, "The Development of the Toyota Lean Burn Engine") will produce a smooth fuel-air metering as a function of time. In addition, there are a number of other continuous flow fuel air metering systems which do the required accurate and smooth fuel-air metering.

Consideration of FIG. 20 shows that very low $NO_x$ outputs are possible with lean combustion. However, the range of air-fuel ratios where the $NO_x$ is low is relatively narrow, and is relatively close to the engine misfire levels. In consequence, the fuel-air metering system required for low $NO_x$ operation in the lean regime requires relatively accurate fuel-air metering. The air-fuel ratio ranges involved constitute a "small target" for the fuel-air metering device. However, the percentage metering errors tolerable in the lean regime are considerably wider than those required for adequate function with a three-way catalyst system.

At present, it should be clear to one skilled in the automotive engineering arts how to deisgn a vortex air-fuel mixer. The present invention mixer makes possible significant improvements in engine performance with respect to fuel economy, emissions, and drivability.

Vehicle Experience

The research and development effort on the vortex mixer has been extensive, and has produced too much data to be fully recounted here. However, the inventors have accumulated a considerable amount of experience with a vortex similar to that shown in FIGS. 13 and 14 mounted on a Buick 1978 Skyhawk vehicle equipped with a 3.8 liter V-6 engine, with the vortex mated to a high performance after-market intake manifold. This vehicle has been tested extensively at Southwest Research Institute in San Antonio, Tex. and the vehicle has produced important and promising results.

With this vehicle set up to operate on a lean air-fuel ratio (frequency leaner than 21 to 1) fuel economy and emission results have both been extremely promising. Perhaps the most important result has been that the vortex equipped vehicle seems to be producing a consistent fuel economy advantage of more than 20% when compared to the base-line stock vehicle. Testing the vehicle at 3,500 pounds inertial weight over the EPA CVS hot cycle, the vehicle has frequently produced mileages in excess of 23 miles per gallon. This compares with mileage on the same cycle generally under 18.5 miles per gallon for the conventionally tested engine at 3,500 pounds. The test vehicle had less than 18.5 miles per gallon in its stock configuration prior to modification. The mileage advantage found with the lean burn vortex equipped engine is due to a combination of factors. With the leaner mixtures, pumping losses are reduced. Lean mixtures are thermdynamically more efficient given adequate combustion. In addition, there is reason to believe that combustion efficiency at part loads is significantly improved. Complete mixing completes the combustion process of CO burnout earlier in the expansion cycle, yielding higher thermal efficiency. Whatever the details of the explanation of the vehicle's mileage improvement, the improvement itself has been verified experimentally many times and at several laboratories.

With the vehicle in lean configuration the drivability of the vehicle has been rated as excellent by experts at Southwest Research. In addition, since the engine is set up to have a near stoichiometric mixture under wide open throttle conditions, the peak power and hence the acceleration of the vehicle with the vortex is superior to that of the stock vehicle. It should be emphasized that the vortex mixer per se will not much increase engine power. However, the vortex mixer eliminates the necessity to handle two-phase flows in intake manifold passages, and therefore the vortex mixer permits more open intake passages than would otherwise be commercially acceptable. These more open intake passages increase engine power.

As of the time of filing of this case, the $NO_x$ output of the vehicle has been somewhat above the 1.0 gram per mile $NO_x$ standard. On the basis of steady-state results, we believe that this is due to a pronounced irregularity of the fuel flow from the carburetor feeding the vortex, and irregularity due to intermittent fuel flow in the main venturi due to air bleeds. This fuel flow intermittency due to air bleed bubbles has been observed by many other workers. A special sintered metal air-bleed arrangement producing small bubbles has been developed by Toyota to eliminate this fuel flow irregularity. The inventors have reason to believe that when they eliminate the unsteadiness of the fuel input of the carburetor feeding the vortex (or replace the carburetor with a smooth fuel input continuous flow air-fuel metering system) the vehicle will be comfortably below the 1.0 gram per mile $NO_x$ standard with excellent drivability and with fuel economy which is not worse than that obtained already. The importance of the smooth fuel air input into the vortex for low $NO_x$ operation in the lean range was emphasized with reference to the discussion of FIGS. 19 and 20.

One very interesting experiment with the vortex equipped vehicle was made possible by the cold weather of Madison, Wis. The inventors had repeated occasion to test the cold start capability of the vortex equipped vehicle, after cold soaks at very low temperatures. With a simple choke arrangement which was very rapidly turned off (within about one minute) we were able to get extremely excellent cold start and drive-away performance at temperatures down to minus 32 degrees centigrade. After the initial shake-out of the choke programming, the engine invariably started and drove away smoothly with only a few seconds of cranking. The inventors do not believe that they have driven another vehicle with the cold start and cold drive-away smoothness and ease which they experienced with the vortex equipped vehicle herein described.

Vortex Designed for Alternative Fuels

The vortex mixer, since it is a very efficient mixer and fuel evaporator, is well adapted for efficient evaporation and mixing of any engine fuel. Because of well-known problems of fuel supply economics, fuels different from conventional gasoline are of commercial interest. Most of this interest centers around alcohols and fuels derived from hydrogenation of coal, particularly the hydrogen poor high octane fuels called napthalenics.

Mixing of alcohol in the vortex is straightforward, and the problems are easy to understand. The fundamental difficulty with evaporating and mixing an alcohol based fuel is the significantly higher heat of vaporization of alcohols in comparison with conventional gasolines. Although the equilibrium air distillation temperatures required to evaporate alcohols may be quite low, much heat is required to accomplish evaporation. To efficiently burn alcohols in an engine equipped with a vortex it is necessary that the vortex be arranged with sufficient exhaust flow capacity and enough fin to transfer the necessary heat to the vortex peripheral wall surface to evaporate the alcohol fuel. Since the heat available in the engine exhaust is very much greater than the heat required to evaporate an alcohol fuel this is a relatively straightforward engineering problem involving heat exchanger passage sizing. Exhaust flow (and hence heat addition) past the vortex heat exchanger fins is conveniently controlled by means of a temperature controlled ported vacuum switch. Such a ported vacuum switch will automatically control the vortex exhaust flow to maintain the desired range of vortex temperature. Since the evaporation temperatures required for evaporating the alcohol are relatively low, such a ported vacuum switch controlled exhaust flow control will automatically adapt itself to varying alcohol percentages and the fuel supply to a vehicle.

J. P. Longwell and others have pointed out that napthalenic fuels (very low hydrogen to carbon ratio fuels derived from coal) can be derived from lignite relatively much more cheaply than more hydrogenated fuels. These coal liquid fuels have significant advantages in a spark-fired engine. Specifically, the napthalenic and highly aromatic coal liquid fuels have very high octane numbers. However, operation with these fuels has heretofore been impractical because they form soot when burned even slightly rich.

There is reason to believe that these napthalenic hydro-carbon fuels can be efficiently mixed in a vortex and burned lean, in a way where carbonaceous deposits and soot would not be formed. If this is in fact practical, the utilization of coal as a motor fuel source will be significantly more economic than otherwise. Research attempting to show that this engine operation is possible with a vortex mixer is underway at the University of Wisconsin under the supervision of Professors P. S. Myers and O. A. Uyehara, and the work is being significantly assisted by the inventors.

There appeared to be two sorts of problems related to burning the coal liquids in a spark-fired engine. First, the mixture delivered to the combustion chambers must always be lean, even at microscale sample volume scales, and it is desirable that there be no liquid phase delivered to the engine, since evaporation of boundary layers involves rich zones which form soot. The vortex mixer is well adapted to produce this homogeneous mixture supply. The other problem is that carbonaceous or gummy deposits must be avoided in the vortex mixing chamber itself. It appears that it will be possible to avoid these deposits with a vortex designed so that the fuel in the mixing chamber is in the form of a splash-cloud (as before described) under the conditions where the vortex peripheral wall is heated enough to react the fuel. To avoid deposits with any fuel, including a napthalenic fuel, it is desirable to have the vortex peripheral walls as low in temperature as possible, and as uniform in temperature as possible. It appears to be possible to burn the napthalenic fuels in a vortex equipped engine without either combustion chamber carbon deposits or vortex chamber deposits. It should be mentioned that much research on fuel deposit formation rates has been done by William Taylor of Exxon Research and Development Corporation and that some of this data will be relevant to design if deposit formation becomes a problem with the napthalenics or with any other fuels.

Detail Design Issues

A number of detailed design issues are relevant to the present invention vortex mixer. First, one skilled in the production arts will clearly see that the vortex mixer is well adapted to die-casting from aluminum. To minimize production costs, it is desirable to minimize the amount of metal in the vortex mixer. This weight minimization is also highly desirable in terms of rapid warm-up; the lighter the vortex mixer structure is, the more rapidly it can be heated up to steady-state temperature after a cold start.

There are some fairly straightforward details relevant to the design of the vortex heat exchanger passages. The heat exchanger relations in the vortex mixer are such that the heat exchanger fins can readily be made of aluminum, and maximum fin temperatures can readily be held below 175 degrees C. It is desirable that the fin areas be arranged so that the temperature around the outside peripheral wall of the vortex mixer is relatively uniform. With a splashcloud of fuel droplets, this temperature condition is relatively easy to arrange, but a very smooth temperature distribution around the outlet will involve some degree of emperical trimming of fin areas based on data generated by thermocouples located around the vortex peripheral wall.

Other issues involving the vortex heat exchanger sections come into play when water condenses within the heat exchanger sections during engine shut-down or early in the cold start sequence. When the vortex is cold, water vapor from the exhaust will condense and accumulate within the vortex heat exchanger sections. Because the exhaust gas will also contain large volumes of carbon dioxide (as well as traces of ash and sulfates) the PH of the condensate will be acidic, and somewhat corrosive. Metallurgically, it appears that very high silicon aluminums (which are easy to die-cast and relatively inexpensive) have the requisite corrosion resistance for durability in the presence of this relatively acidic condensate. However, corrosion resistant coatings on the heat exchanger fins can readily be employed. Another issue involving condensate in the heat exchanger area around the vortex fins involves freezing. The passages need to be designed so that ice does not block the exhaust flow, or the vortex can not warm up fast enough during start up.

Summary

A partial summary of a vortex mixer is useful here. The vortex mixer functions as follows:

Part of the isentropic expansion flow velocity past the engine air-flow control throttle valve is delivered tangentially and relatively smoothly into a nearly radially symmetric vortex mixing chamber. This tangentially introduced inlet flow provides annular momentum which, in interaction with the geometry of the vortex chamber, drives the flow within the vortex chamber into an inwardly spiralling pattern. If boundary layer geometries are controlled properly, for example with the weirs disclosed in this application, the flow pattern within the vortex mixing chamber is an excellent approximation to an irrotational flow vortex with turbulence superimposed on the mean flow streamline. The air flow from the outside of the vortex chamber spirals inwardly to the central outlet in a flow pattern which is very predictable and extremely conductive to mixing.

The vortex air-flow patterns serves as an inertial separator with centrifugal forces generally in excess of a thousand "G's". Fuel droplets are flung to the outside peripheral wall of the vortex mixing chamber by these centrifugal forces. The combination of the centrifugal force and the rapidly swirling flow forms an equilibrium splash cloud around the vortex chamber outside wall. This splash cloud continuously sprays and wets the outside wall surface, which is heated for extremely rapid evaporation. The evaporation all around the vortex chamber outside wall combines with the vortex flow pattern of the air to produce exceptionally rapid and complete fuel air mixing within the vortex mixing chamber. The mixing chamber functions nicely under all engine operating conditions. At cold start, the vortex rapidly evaporates the light ends of the fuel, while the heavy ends of the fuel accumulate around the vortex peripheral wall. Excellent cold start characteristics are therefore possible without ever delivering a rich (pollution causing and fuel wasting) mixture to the engine cylinders. The vortex warms up rapidly. Under normal driving conditions the warm vortex feeds a homogeneous mixture of vaporized fuel and air to the intake manifold of the engine. Under very low manifold vacuum wide open throttle conditions the vortex flow slows down. Fuel is still evaporated from the mixing chamber walls, but heat transfer rates at the vortex wall interfaces are low enough that the air surrounding the fuel evaporating boundary layers is cold. Much of the evaporated fuel therefore recondenses, so that the vortex functions as a smoke generator. In this smoke generating mode the vortex mixer can function with very low flow resistance and will feed a relatively cold and dense charge to the engine cylinders for peak power.

A short discussion of the drawings will assist in summarizing the subject matter in the present case. FIGS. 1 and 2 show views of a fluidically efficient vortex mixer. In considering FIG. 1, the fluid mechanics within the vortex chamber per se and the details of the flow streamlines to the left of section AA should be essentially invarient regardless of whether the vortex of FIG. 1 is fed with an entrance section such as that shown in FIG. 3 and FIG. 1, or whether the substitute round to trapezoidal transition section shown in FIGS. 4 and 5 is substituted. Either throttle body containing entrance section assembly will deliver high velocity flow to the main body of the vortex mixer in a form which will efficiently drive an irrotational vortex within the vortex mixer chamber. A large number of views of the round throttle plate to trapezoidal entrance assembly were necessary to clarify its shape.

For the entrance section of FIG. 3 a corner notch opening assured that a significant fraction of the idler air flow formed a jet which attached to the adjacent walls of a corner of the passage. For the round throttle to trapezoidal entrance section shown in FIGS. 4 and 5 a nozzle 68 is arranged for the same purpose. In both cases, the high speed jet so formed attaches to the corner between two adjacent walls and flows smoothly into the main vortex chamber. Corner wall attached jets spread relatively slowly. Putting a large fraction of the idle flow into such a corner wall attached jet reduces losses in the vortex entrance section and drives a stronger vortical flow within the vortex mixer than would otherwise be possible under idler and off-idle engine operating conditions.

FIGS. 6, 7, 8 and 9 explain the flow structure of an irrotational flow vortex, and show how this flow pattern is useful for mixing. FIG. 12 explains in light of FIGS. 10 and 11 the function of vortex mixing chamber weirs, which permit the irrotational flow pattern to flow and be stable within the vortex mixing chamber.

FIGS. 13 and 14 show a vortex mixer having vortex mixing chamber fluid mechanics nearly identical to the fluid mechanics shown with respect to FIG. 1, but where the entrance section is specifically adapted for a down-draft carburetor. FIGS. 15, 16, 17 and 18 show a more primitive vortex mixer.

FIGS. 19 and 20 are included to explain the value of the vortex mixer operated as the lean burn system, and a number of issues which must be tended to for satisfactory lean operation with minimum $NO_x$ emissions were discussed.

What is claimed is:

1. A mixing device for homogenizing and vaporizing a fuel-air mixture from a fuel-air metering means of an internal combustion engine for delivery to the intake manifold of said engine, wherein the fuel-air metering means has an airflow passage with a variable restriction therein, said mixing device comprising a mixer housing, said mixer housing having an inlet passage and an outlet passage, said inlet passage being adapted for connection to the discharge side of the air-flow passage of the fuel-air metering means and positioned with respect to the mixer housing so that the air flowing across the variable restriction of the fuel-air metering means into the inlet passage and out into the mixer housing produces angular momentum with respect to the mixer housing outlet passage, said mixer housing being shaped so that the angular momentum of flow produces a vortex rotation about the outlet passage with the outlet passage being the sink of the vortex, said outlet being adapted to be connected to the intake manifold, and means for heating the housing to vaporize the liquid fuel which is deposited thereon by the centrifuging effect of the vortex and the turbulence of the flow.

2. The invention as set forth in claim 1 and wherein the means for heating the housing comprises a plurality of fins attached thereto, and means for directing hot exhaust gases over the fins to heat same.

3. The invention as set forth in claim 1 and wherein means are provided in the housing outlet to reduce the swirl of the flow passing through said outlet.

4. The invention as set forth in claim 1 and wherein heating means are provided to add internal energy to the air-fuel mixture prior to introduction into the mixer housing.

5. The invention as set forth in claim 1 and wherein the means for heating the housing include electrical resistance means.

6. A mixing device for homogenizing and vaporizing a fuel-air mixture from a fuel-air metering means of an internal combustion engine for delivery to the intake manifold of said engine, said fuel-air metering means having a discharge air passage with a conformingly shaped variable throttle restriction therein for controlling flow of the air to the inlet of the housing whereby the air will pass by the throttle restriction and attach to a wall of the discharge passage beneath the throttle restriction in the manner of a "Coanda" wall attached stream, said mixing device comprising a mixer housing having an inlet and an outlet, said inlet being adapted for connection to the discharge air passage of the fuel-air metering means, deflector means in the inlet to cause the air stream to enter the housing with angular momentum with respect to the outlet, said fuel-air metering means controlling fuel flow into the housing, said housing being shaped so as to conserve at least a portion of said angular momentum of flow whereby a vortex rotation about the outlet is formed with the outlet being the sink of the vortex, said outlet being adapted to be connected to the intake manifold and means for heating the housing to vaporize the liquid fuel which is deposited thereon by the centrifuging effect of the vortex.

7. The invention as set forth in claim 6 and wherein the housing inlet is related to the air discharge passage of the fuel-air metering means so that the flow past the fuel-air metering means air discharge passage attaches to a surface of the inlet where said surface is shaped so that there will be no raised element to interfere with the Coanda stream proceeding from the discharge air passage of the fuel-air metering means into the housing inlet.

8. The invention as set forth in claim 7 and wherein the deflection means comprises deflectors in the housing inlet, said deflectors being positioned to receive the stream issuing from the discharge and to direct said stream into the housing with angular momentum with respect to the housing inlet.

9. The invention as set forth in claim 6 and wherein the housing is provided with a plurality of spaced circular weir projections concentric with the outlet so as to stabilize the main vortical flow in the form of a generally irrotational vortex.

10. The invention as set forth in claim 6 and wherein heating means are provided for heating inlet air prior to introduction into the mixer housing.

11. A mixing device for homogenizing and vaporizing a fuel-air mixture from a fuel-air metering means of an internal combustion engine for delivery to the intake manifold of said engine, wherein the fuel-air metering means has an air flow passage with a variable restriction therein, said mixing device comprising a generally circular mixer housing including a top and a bottom connected by a peripheral outer wall, the bottom being provided with a centrally positioned outlet adapted for connection to the intake manifold of an internal combustion engine, said housing having an inlet immediately adjacent the outer wall and adapted for connection to the fuel-air metering means air flow passage which delivers air to the mixer housing through said inlet, deflection means for directing the air from the air flow passage of the fuel-air metering means tangentially with respect to the housing so that the flow within the housing is a stabilized vortex flow whereby the flow will move in a swirling manner spiralling inwardly for discharge through the outlet in the housing bottom, and means for heating the peripheral outer wall so as to evaporate the liquid fuel which is deposited thereon when the mixer is in operation.

12. The invention as set forth in claim 11 and wherein within the housing the top or bottom is provided with a plurality of spaced circular weir shaped protrusions extending inwardly therefrom and concentric with the outlet so as to stabilize the main vortical flow in a form wherein the mean flow streamlines approximate an irrotational potential flow vortex.

13. The invention as set forth in claim 11 and wherein the heating means comprises a plurality of fins connected to the outer surface of the peripheral wall, and means for directing hot exhaust gases over the fins to heat same.

14. The invention as set forth in claim 11 and wherein means are provided in the housing outlet to reduce the swirl of the flow entering said outlet.

15. The invention as set forth in claim 11 and wherein heating means are provided to increase the internal energy of the air prior to introduction into the mixer housing.

16. The invention as set forth in claim 11 and wherein the outlet is centrally positioned in the top rather than the bottom.

17. A mixing device for homogenizing and vaporizing a fuel-air mixture from a fuel-air metering means of an internal combustion engine for delivery to the intake manifold of said engine, wherein the fuel-air metering means has an air flow passage with a variable restriction therein, said mixing device comprising a mixer housing having an inlet and outlet, said inlet being adapted for connection to the discharge side of the fuel-air metering means air flow passage; deflector means at the inlet adapted to deflect the flow from said fuel-air metering means air flow passage so that the flow is deflected by said deflector means in a direction so that the flow has an angular momentum with respect to the outlet, said housing being shaped so that the angular momentum of flow produces a vortex rotation about the outlet with the outlet being the sink of the vortex, said outlet being adapted to be connected to the intake manifold, and means for heating the housing to vaporize the liquid fuel which is deposited thereon by the centrifuging effect of the vortex.

18. The invention as set forth in claim 17 and wherein the means for heating the housing comprises a plurality of fins attached thereto, and means for directing hot exhaust gases over the fins to heat same.

19. The invention as set forth in claim 17 and wherein means are provided in the housing outlet to reduce the swirl of the flow passing through said outlet.

20. The invention as set forth in claim 17 and wherein heating means are provided to add internal energy to the air prior to introduction into the mixing housing.

21. The invention as set forth in claim 17 and wherein the means for heating the housing includes electrical resistance means.

22. A mixing device for homogenizing and vaporizing a fuel-air mixture from a fuel-air metering means of an internal combustion engine for delivery to the intake manifold of said engine, wherein the fuel-air metering means has an air flow passage with a variable restriction therein, said mixing device comprising a mixer housing having an inlet and an outlet, said inlet being connected to the discharge side of the air flow passage of the fuel-air metering means, deflector means at the inlet adapted to cause the flow from the air flow passage of the fuel-air metering means to enter the housing with angular momentum about the outlet, said fuel-air metering means controlling flow of the fuel into said housing, said housing being shaped so as to conserve at least a portion of said angular momentum of flow whereby a vortex rotating about the outlet is formed so that the outlet is the sink of the vortex, said outlet being adapted to be connected to the intake manifold, means for reducing the flow resistance of the air-fuel mixture leaving the housing and means for vaporizing the liquid fuel which is deposited onto said housing surfaces by the centrifuging effect of the vortex.

23. The invention as set forth in claim 22 and wherein the means for heating the housing is arranged to maintain even temperatures.

24. The invention as set forth in claim 22 and wherein the housing has a top and bottom connected by a peripheral wall, said peripheral wall having heating means disposed so as to provide additional heat at those points on the peripheral wall where a disproportionate fraction of the fuel impacts on said wall.

25. The invention as set forth in claim 22 and wherein the housing is made of aluminum.

26. The invention as set forth in claim 25 and wherein the heating means comprises a plurality of fins integral with the housing in contact with the hot exhaust gases.

27. The invention as set forth in claim 26 and wherein the portions of the housing and fins in contact with the hot exhaust gases are coated with an oxidation and corrosion protective material.

28. A mixing device for homogenizing and vaporizing a fuel-air mixture from a fuel-air metering means of an internal combustion engine for delivery to the intake manifold of said engine, wherein the fuel-air metering means has an air flow passage with a variable restriction therein, said mixing device comprising a mixer housing having an inlet and an outlet, said inlet being connected to the discharge side of the fuel-air metering means air flow passage, deflector means in the inlet adapted to cause the flow from the fuel-air metering means air flow passage to enter the housing with angular momentum about the outlet, said fuel-air metering means controlling flow of the fuel into said housing, said housing being shaped to as to conserve at least a portion of said angular momentum of flow whereby a vortex rotating about the outlet is formed so that the outlet is the sink of the vortex, said outlet being adapted to be connected to the intake manifold, means for reducing the flow resistance of the air-fuel mixture leaving the housing and means for vaporizing the liquid fuel which is deposited onto said housing surfaces by the centrifuging effect of the vortex.

29. The invention as set forth in claim 28 and wherein the means for reducing the flow resistance of the air-fuel mixture leaving the housing is positioned in the mixer outlet.

30. The invention as set forth in claim 28 and wherein the mixer outlet is generally circular and is provided with a plurality of deflecting structures for converting the tangential velocity of the vortex flow radially into the outlet to increase the discharge coefficient of the outlet.

31. The invention as set forth in claim 29 and wherein the means for reducing the flow resistance of the air-fuel mixture leaving the housing comprises deflector means for smoothly deflecting flow in the outlet into the direction of the axis of the outlet so as to reduce the coefficient of discharge of said outlet.

32. A mixing device for homogenizing and vaporizing a fuel-air mixture from a fuel-air metering means of an internal combustion engine for delivery to the intake manifold of said engine, wherein the fuel-air metering means has an air flow passage with a variable restriction therein, said mixing device comprising a generally circular mixer housing including a top and a bottom connected by a peripheral outer wall, said housing being provided with a centrally positioned outlet adapted for connection to the intake manifold of an internal combustion engine, said peripheral outer wall having an opening therein, inlet passage means connected to said opening and a fuel-air metering means, means in communication with the fuel-air metering means to introduce air into said inlet passage means, the inlet passage means directing the air past said peripheral wall opening and into said circular housing with high velocity tangentially with respect to the circular housing peripheral wall whereby a swirling and inwardly spirally flow is developed in the circular mixer housing, a deflector positioned in the opening in the peripheral outer wall arranged to cause the flow within the mixer housing to maintain a roughly circular flow path across said peripheral wall opening approximately corresponding to the curvature of the peripheral outer wall, so that a strong vortical flow is established and maintained within said generally circular housing.

33. The invention as set forth in claim 32 and wherein the bottom of the mixer housing is upwardly convex so that liquid fuel developed on the bottom under cold start conditions will accumulate adjacent the peripheral wall to avoid liquid fuel discharge through the chamber outlet.

34. The invention as set forth in claim 32 and wherein the top and bottom of the mixer housing are each formed as surfaces of revolution wherein the center of said surfaces of revolution is the central axis of the housing outlet.

35. The invention as set forth in claim 36 and wherein the EGR is introduced into the entrance section.

36. A mixing device for homogenizing a fuel-air mixture for an internal combustion engine having an intake manifold for directing the fuel-air mixture to at least one cylinder, said device including a source of inlet air, an entrance section for said air, a variable area air throttling valve in the entrance section passage of said entrance section, and a vortex chamber connected to the entrance section passage, said vortex chamber having an outlet supplying the intake manifold of the internal combustion engine, the outlet being centrally and axially positioned in the vortex chamber, said chamber having a peripheral wall extending around the centrally positioned outlet whereby the vortex chamber functions by interaction with the entrance section passage to stabilize a relatively vortical flow pattern within said vortex chamber and rotating about said central outlet in said vortex chamber, means for introducing fuel whereby said fuel flows to the peripheral wall of the vortex chamber, said entrance section introducing air flow from the variable area air throttling valve into the vortex chamber in a form where a large portion of the flow velocity past said air throttling valve is introduced smoothly into the vortex chamber in a tangential direction having high angular momentum with respect to the vortex outlet in the vortex chamber.

37. The invention as set forth in claim 36, and wherein the flow introduced from said entrance section into said vortex chamber is introduced in a direction tangential to the outside diameter of the vortical flow in said vortex chamber whereby the interaction of the geometry of said entrance section and said vortex chamber is arranged so that the entrance flow drives the said vortical flow into a pattern where the mean flow streamlines of said vortical flow form an approximately irrotational vortex flow pattern.

38. The invention as set forth in claim 36 and wherein the geometrical relations between said entrance section and said variable area air throttling valve proceeds through said entrance section and into said vortex chamber as follows:

the variable flow area of said throttling valve is formed so that the flow past said throttle forms jets adjacent smooth walls of said entrance section passage, whereby said jets attach to said walls to form Coanda wall attached streams which flow in a pattern determined by the interaction of inertial physics and pressure forces generated by the Coanda wall interaction so that the wall shaping smoothly guides these wall attached jets for tangential entry into the outside diameter of the vortical flow within said vortex chamber.

39. The invention as set forth in claim 38 and wherein the passage geometry of said entrance section in interaction with said wall attached jet flow forms and stabilizes a stable nonmodal system of parasitic vortices, whereby parasitic vortices smoothly mesh with said wall attached jets to form a flow pattern which reduces velocity gradients between said jets and the remaining air volume within said entrance passage so as to reduce turbulent spreading and decay of said wall attached jets.

40. The invention as set forth in claim 39 and wherein a deflector vane is provided within the entrance section whereby one of the said parasitic vortex flow patterns is stabilized by interaction with said vane and whereby the fluid mechanical interactions in said parasitic vortex system are such that said stabilized parasitic vortex thereby stabilizes the flow geometry of the entire parasitic vortex system within said entrance section.

41. The invention as set forth in claim 39 and wherein the EGR is introduced into the system of parasitic vortices in the entrance chamber whereby said EGR is smoothly introduced by mixing into the wall attached jets.

42. The invention as set forth in claim 38 and wherein said entrance section comprises a relatively smooth flow passage transition from a generally circular inlet flow passage cross section containing an air throttling valve of generally circular butterfly type and an entrance section outlet of roughly trapezoidal shape having two sides roughly perpendicular to the central axis of said vortex chamber outlet and two sides roughly parallel to said outlet central axis, wherein the junctions of said respective sides are called corner sections, and wherein the high-speed flow past said butterfly valve restriction attaches to the passage wall to form a Coanda wall attached jet flow pattern, whereby the inlet passage transition section is shaped so that the interaction of inertial forces on said jet flow pattern and the pressure forces due to the wall attachment effect smoothly guide said jet flow pattern whereby the great majority of the mass flow in said jet flow pattern flows into said corner sections and adjacent said roughly parallel passage wall sides, and whereby the curvature of the outlet of said entrance section passage guides said jets for smooth tangential introduction to the outside of the vortex pattern within said vortex chamber.

43. The invention as set forth in claim 36 and wherein there are positioned around said vortex chamber outlet a multiplicity of deflector vanes arranged to deflect tangential velocity of the flow interacting with said vanes in a radial direction, to significantly reduce the swirl and organized vortical character of the flow within said outlet chamber, and wherein said deflector vanes are so arranged that the detailed fluid mechanical relations within said outlet chamber are significantly decoupled from the vortical flow pattern which occurs in said vortex chamber between said central outlet deflector vanes and the peripheral wall of said vortex chamber.

44. The invention as set forth in claim 43 and wherein a variable geometry spoiler vane is arranged so that it can be actuated between a position totally within said fluid mechanically decoupled volume within said outlet deflector vanes and a spoiler vane position which significantly protrudes into the vortical flow passage outside said deflector vanes to disrupt the vortical flow which would otherwise occur in said vortical flow passage, thereby selectively reducing the total flow resistance of said mixing device under wide open throttle conditions.

45. The invention as set forth in claim 36 and wherein variable geometry means are provided in the vortex chamber to destroy the high angular flow about the outlet when the air throttle is nearly wide open to reduce the total flow resistance past said mixing device under such wide open throttle conditions.

46. The invention as set forth in claim 36 and wherein the means introducing fuel directs the fuel into the idle jet stream whereby said fuel flows to the peripheral wall of the vortex chamber.

47. The invention as set forth in claim 36 and wherein the means for introducing fuel is positioned to inject the fuel directly into the wall attached air stream.

48. The invention as set forth in claim 36 and wherein fuel is directly injected into vortex chamber.

49. The invention as set forth in claim 36 and wherein the means for introducing fuel provides that the instantaneous rate of fuel supply under steady-state conditions is relatively steady and smooth.

50. The invention as set forth in claim 36 and wherein the peripheral wall of the vortex chamber is heated to vaporize the liquid fuel which comes in contact therewith.

51. The invention as set forth in claim 50 and wherein the peripheral wall of the vortex chamber is provided externally with fins heated by exhaust gases.

52. The invention as set forth in claim 50 and wherein a portion of the peripheral wall of the vortex chamber is heated by an evaporation-condensation heat exchanger connected with exhaust heating means.

53. A mixing device for homogenizing a fuel-air mixture for an internal combustion engine having an intake manifold for directing the fuel-air mixture to at least one cylinder, said device including a source of inlet air, an entrance section for said air, a variable area air throttling valve system in the entrance section passage of said entrance section, and a vortex chamber connected to the entrance section passage, said vortex chamber having an outlet supplying the intake manifold of the internal combustion engine, the outlet being centrally and axially positioned in the outer chamber, said chamber having a peripheral wall extending around the centrally positioned outlet whereby the vortex chamber functions by interaction with the entrance section passage to stabilize a relatively vortical flow pattern within said vortex chamber and rotating about said central outlet in said vortex chamber, means for introducing fuel whereby said fuel flows to the peripheral wall of the vortex chamber, the entrance section passage having an outlet generally trapezoidal in cross section with the respective sides converging to form junctures called corners wherein there is a minimum flow through the entrance section called idle flow, wherein there is a minimum flow area past said throttling valve system corresponding to said idle flow and wherein said throttling system is configured so that a significant fraction of the idle flow passes through a concentrated area of said throttling system configured with respect to the passage walls of said entrance section so that idle flow fraction forms a concentrated wall attached jet, and wherein the shape of said inlet passage is such that said jet is guided predominantly to a single corner section of said entrance passage so that the turbulent decay of said jet is minimized and the fluidic efficiency of the flow introduction into said vortex chamber is thereby maximized under near idle and idle flow conditions and the flow is smoothly introduced into the vortex chamber in a tangential direction having relatively high angular momentum with respect to the vortex outlet in the vortex chamber.

54. The invention as set forth in claim 53 and wherein said means for introducing fuel whereby said fuel flows to the peripheral wall of the vortex chamber introduces fuel into a high velocity air flow section of said concentrated area of said throttling system so that said fuel is atomized into droplets by said high velocity air flow and wherein said atomized droplets are carried with said air flow into said concentrated wall attached jet and thereby introduced into said vortex chamber at high velocity to attain low total system fuel lags and even distribution of fuel around said vortex chamber peripheral wall for rapid evaporation and complete mixing.

55. A mixing device for homogenizing and vaporizing a fuel-air mixture from a fuel-air metering means of an internal combustion engine for delivery to the intake manifold of said engine, said mixing device comprising a generally circular mixer housing including a top and a bottom connected by a peripheral outer wall, said housing being provided with a centrally positioned outlet adapted for connection to the intake manifold of an internal combustion engine, said peripheral outer wall having an opening therein, air inlet passage means connected to said opening and fuel-air metering means, means in communication with the fuel-air metering means to introduce air into said air inlet passage means, the air inlet passage means directing the air past said peripheral wall opening and into said circular housing tangentially with respect to the circular housing peripheral wall whereby a swirling and inwardly spirally flow is developed in the circular mixer housing, a pivotable throttle plate in the intake passage means to control the passage flow cross section to control the velocity of the tangentially introduced fuel-air mixture delivered into said circular housing.

56. A mixing device for homogenizing and vaporizing a fuel-air mixture from a fuel-air metering means of an internal combustion engine for delivery to the intake manifold of said engine, said mixing device comprising a generally circular mixer housing including a top and a bottom connected by a peripheral outer wall, said housing being provided with a centrally positioned outlet adapted for connection to the intake manifold of an internal combustion engine, said peripheral outer wall having an opening therein, air inlet passage means connected to said opening and a fuel-air metering means to introduce air into said air inlet passage means, the air inlet passage means directing the flow past the peripheral wall opening and into said circular housing tangentially with respect to the circular housing peripheral wall whereby a swirling and inwardly spirally flow is developed in the circular mixer housing, a variable restriction throttling means to vary the inlet passage flow cross section to control the velocity of the fuel-air mixture tangentially introduced into the mixer housing.

* * * * *